US012309085B2

(12) United States Patent
Marzban et al.

(10) Patent No.: US 12,309,085 B2
(45) Date of Patent: May 20, 2025

(54) NULL TONES ADAPTATION USING REINFORCEMENT LEARNING

(71) Applicant: QUALCOMM Incorporated, San Diego, CA (US)

(72) Inventors: Mohamed Fouad Ahmed Marzban, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 17/821,064

(22) Filed: Aug. 19, 2022

(65) Prior Publication Data
US 2024/0063961 A1 Feb. 22, 2024

(51) Int. Cl.
H04L 5/00 (2006.01)
H04B 17/345 (2015.01)
H04L 41/16 (2022.01)
H04W 24/10 (2009.01)

(52) U.S. Cl.
CPC ......... H04L 5/0048 (2013.01); H04B 17/345 (2015.01); H04L 41/16 (2013.01); H04W 24/10 (2013.01)

(58) Field of Classification Search
CPC ... H04L 1/0003; H04L 5/0007; H04L 5/0051; H04L 5/0094; H04L 5/0048; H04L 5/0046; H04L 5/0062; H04L 41/16; H04B 15/00; H04B 17/345; H04W 72/23; H04W 76/27; H04W 80/02; H04W 52/325; H04W 24/10
See application file for complete search history.

(56) References Cited

U.S. PATENT DOCUMENTS

2018/0098330 A1* 4/2018 Nguyen .................... G06N 7/01
2020/0092032 A1* 3/2020 Zhang .................... H04W 72/23
2021/0105785 A1* 4/2021 Manolakos ............. H04J 13/16

* cited by examiner

Primary Examiner — Dady Chery
(74) Attorney, Agent, or Firm — Procopio, Cory, Hargreaves & Savitch LLP/Qualcomm

(57) ABSTRACT

Aspects presented herein may improve interference measurements for dynamic and/or bursty transmissions. In one aspect, a UE receives a configuration of a null tone pattern from a network node, where the configuration of the null tone pattern includes a set of null tones associated with a set of resources, where at least one null tone in the set of null tones corresponds to at least one resource in the set of resources. The UE measures interference corresponding to the set of resources associated with the null tone pattern. The UE transmits at least one of a first indication of an adjusted null tone pattern based on the interference corresponding to the set of resources or a second indication of the interference corresponding to the set of resources, where at least one of the first indication or the second indication is transmitted to the network node.

26 Claims, 14 Drawing Sheets

NULL TONES ADAPTATION USING REINFORCEMENT LEARNING

TECHNICAL FIELD

The present disclosure relates generally to communication systems, and more particularly, to a wireless communication involving null tones.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives a configuration of a null tone pattern from a network node, where the configuration of the null tone pattern includes a set of null tones associated with a set of resources, where at least one null tone in the set of null tones corresponds to at least one resource in the set of resources. The apparatus measures interference corresponding to the set of resources associated with the null tone pattern. The apparatus transmits at least one of a first indication of an adjusted null tone pattern based on the interference corresponding to the set of resources or a second indication of the interference corresponding to the set of resources, where at least one of the first indication or the second indication is transmitted to the network node.

In an aspect of the disclosure, a method, a computer-readable medium, and an apparatus are provided. The apparatus selects a configuration of a null tone pattern including a set of null tones associated with a set of resources, where at least one null tone in the set of null tones corresponds to at least one resource in the set of resources. The apparatus transmits the configuration of the null tone pattern to a user equipment (UE). The apparatus receives at least one of a first indication of an adjusted null tone pattern based on interference corresponding to the set of resources or a second indication of the interference corresponding to the set of resources, where at least one of the first indication or the second indication is received from the UE.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
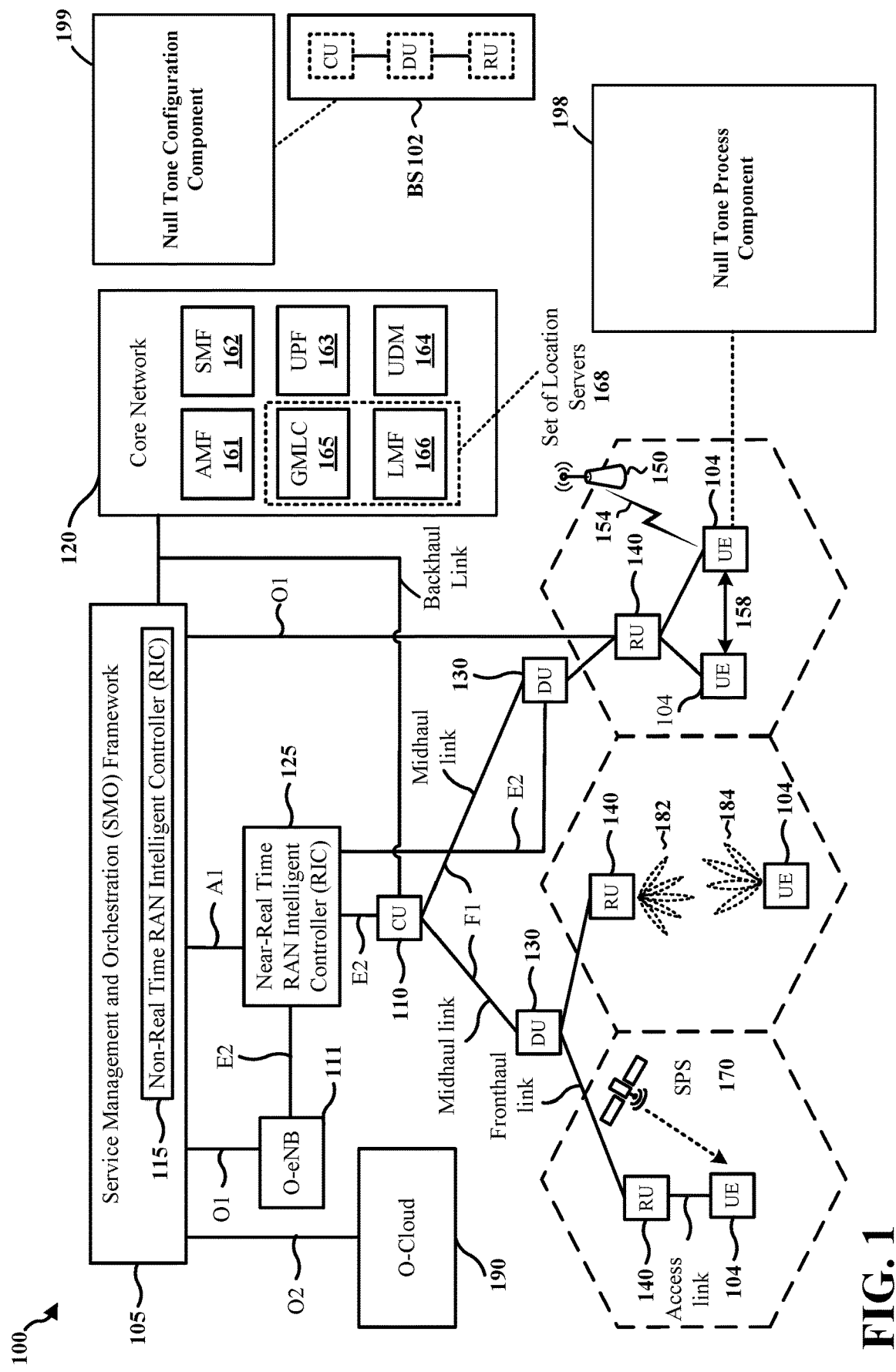
FIG. 1 is a diagram illustrating an example of a wireless communications system and an access network.

Aspects presented herein may improve interference measurements for dynamic and/or bursty transmissions, such as measurements for inter-cell interference in the symbol time scale. Aspects presented herein may enable a network entity to configure one or more null tone patterns for a user equipment (UE), such that the UE may measure interference corresponding to resources associated with the null tone patterns. Aspects presented herein may also enable the network and/or the UE to select or change null tone patterns based on reinforcement learning (RL), such that the accuracy and efficiency of interference measurements may further be enhanced.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Affiance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (MC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an AI interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT MC 125.

In some implementations, to generate AI/ML models to be deployed in the Near-RT RIC 125, the Non-RT MC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to receive a configuration of a null tone pattern from a network node, where the configuration of the null tone pattern includes a set of null tones associated with a set of resources, where at least one null tone in the set of null tones corresponds to at least one resource in the set of resources; measure interference corresponding to the set of resources associated with the null tone pattern; and transmit at least one of a first indication of an adjusted null tone pattern based on the interference corresponding to the set of resources or a second indication of the interference corresponding to the set of resources, where at least one of the first indication or the second indication is transmitted to the network node (e.g., via the null tone process component 198). In certain aspects, the base station 102 may be configured to select a configuration of a null tone pattern including a set of null tones associated with a set of resources, where at least one null tone in the set of null tones corresponds to at least one resource in the set of resources; transmit the configuration of the null tone pattern to a UE; and receive at least one of a first indication of an adjusted null tone pattern based on interference corresponding to the set of resources or a second indication of the interference corresponding to the set of resources, where at least one of the first indication or the second indication is received from the UE (e.g., via the null tone configuration component 199).

Figure 2:
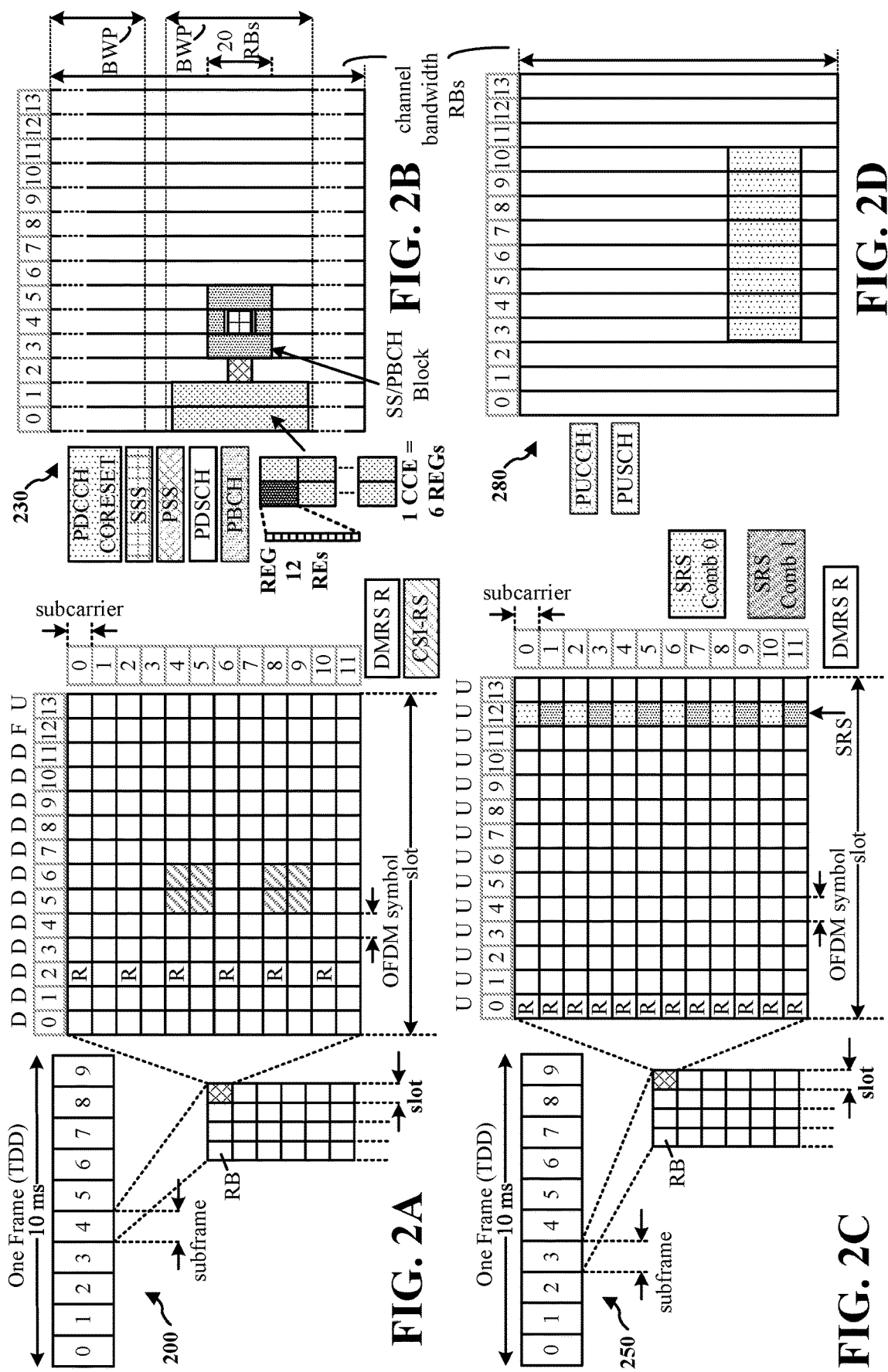
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL), and subframe 3 being configured with slot format 1(with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$ [kHz] | Cyclic pre fix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu \cdot 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
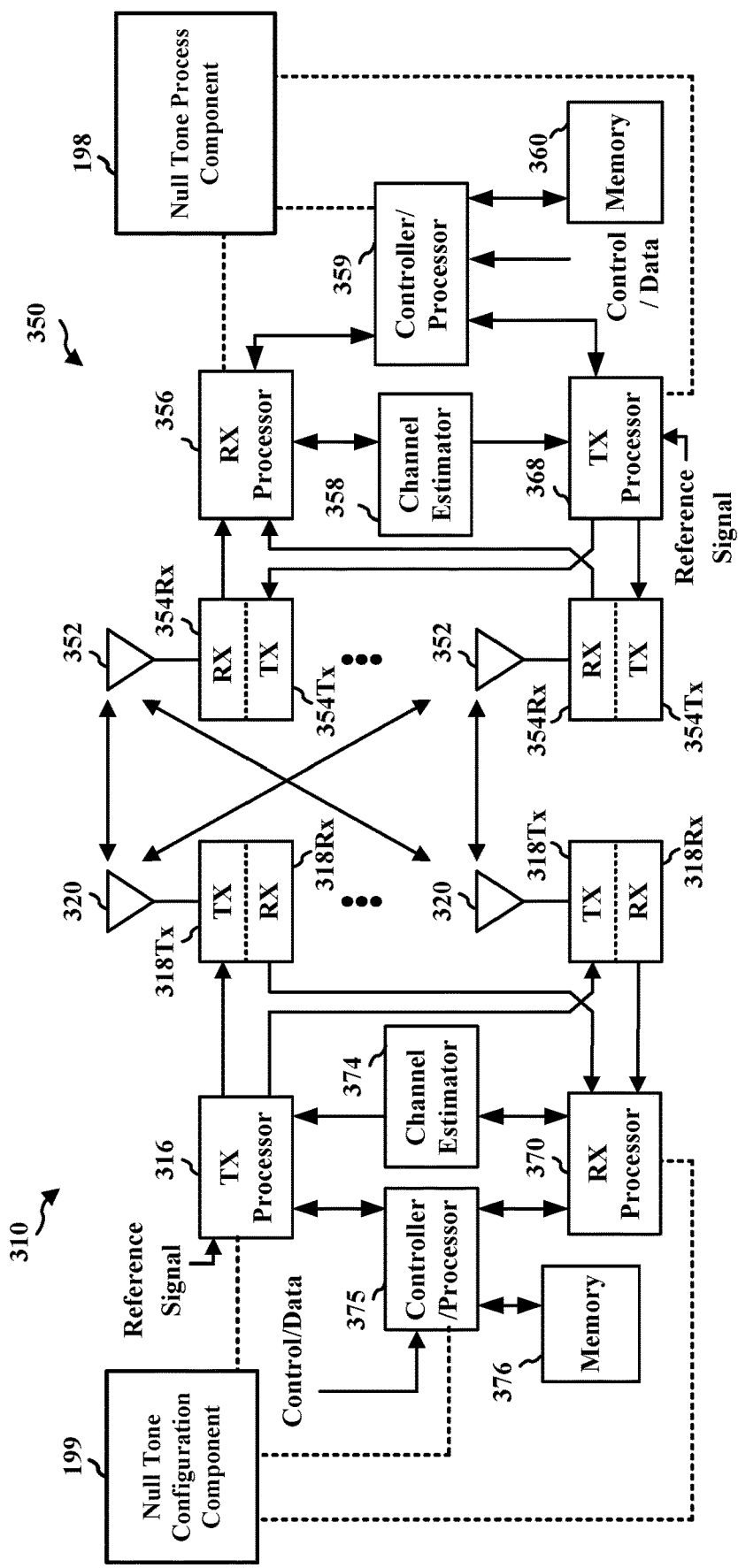
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the null tone process component 198 of FIG. 1.

At least one of the TX processor 316, the RX processor 370, and the controller/processor 375 may be configured to perform aspects in connection with the null tone configuration component 199 of FIG. 1.

As discussed in connection with FIGS. 2A to 2D, the transmission of downlink (DL) and uplink (UL) may be organized into frames, where Each frame may be of 10-millisecond duration. Each frame may be divided into 10 subframes of 1 millisecond, and the subframe may be further divided into slots according to numerology. In some networks (e.g., LTE), there may be just two slots available. In other networks (e.g., 5G NR), the number of slots may vary according to the numerology. As such, slot structures under 5G NR may be more flexible compared to the LTE slot structures. For example, 5G NR slot structures may support mini-slots (or mini-slot transmission) and ultra-reliable low latency communications (URLLC), where a transmission may start at any orthogonal frequency-division multiplexing (OFDM) symbol and to last as many symbols as specified for communication. Short burst of transmission within a regular enhanced mobile broadband (eMBB) slot may also start at arbitrary symbol locations, and unscheduled uplink transmissions without a grant are also allowed under 5G NR slot structures. In addition, 5G NR slot structures may be associated with beam-based transmissions, where interference between communication/wireless devices may fluctuate with beam changes, including refinements.

While 5G NR slot structures may provide higher flexibility compared to other network slot structures, transmissions based on 5G NR slot structures may also be more likely to encounter dynamic inter-cell interference, where the interference may vary in the symbol time scale. However, most interference measurement framework associated with 5G NR (e.g., via channel state information reference signal (CSI-RS) and/or interference measurement resource (IMR), etc.) may just provide measurements of a relatively large time scale, which may not be suitable for measuring inter-cell interference in the symbol time scale.

Figures 4A, 4B:
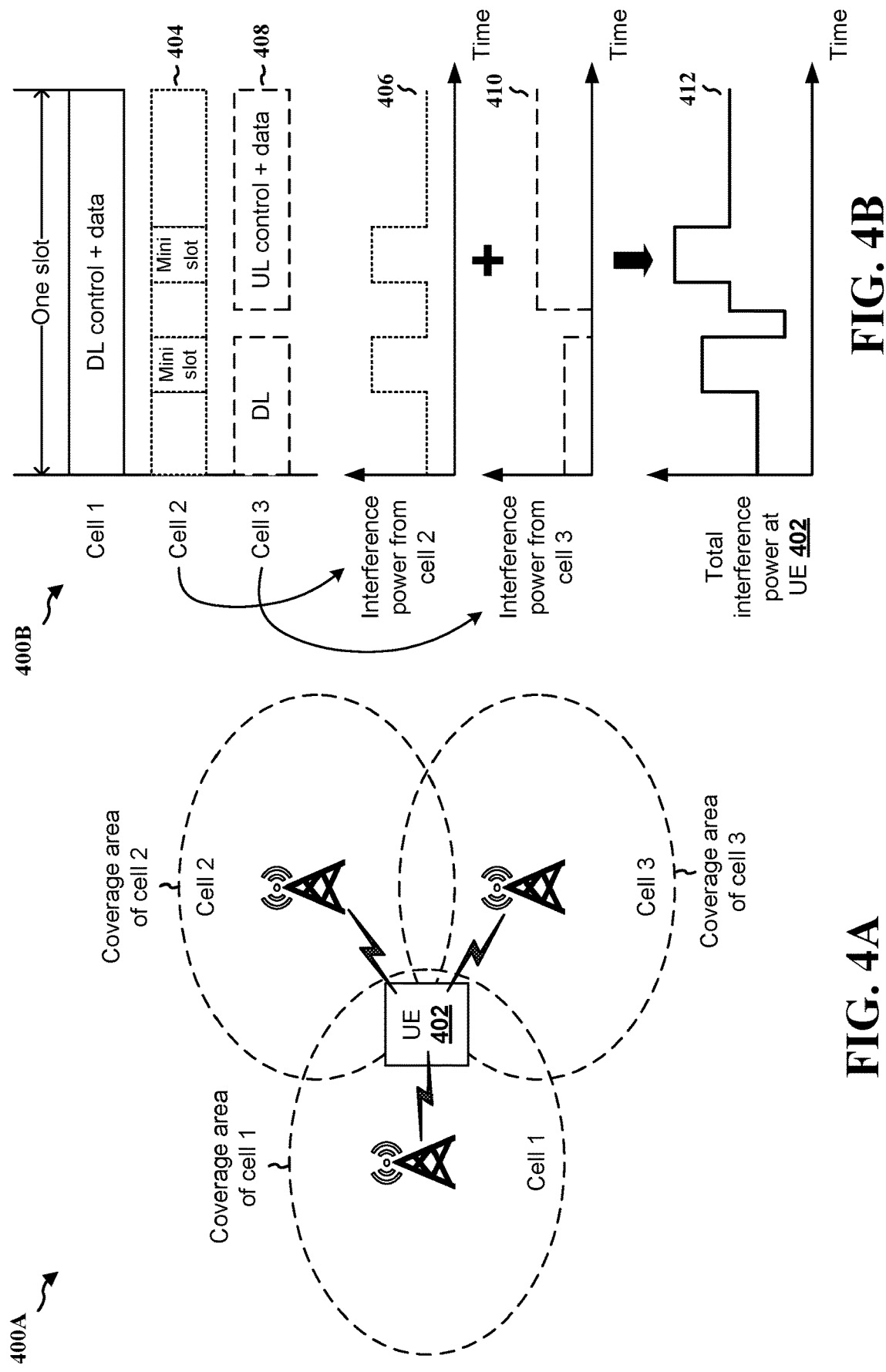
FIG. 4A is a diagram illustrating an example inter-cell interference environment in accordance with various aspects of the present disclosure.
FIG. 4B is a diagram illustrating an example inter-cell interference environment in accordance with various aspects of the present disclosure.

FIGS. 4A and 4B are diagrams 400A and 400B illustrating an example inter-cell interference environment in accordance with various aspects of the present disclosure. As shown by the diagram 400A of FIG. 4A, a UE 402 may be communicating with a first cell (e.g., cell 1), such as receiving a DL slot (e.g., DL control and data) from the first cell. At the same time, a second cell (e.g., cell 2) and a third cell (e.g., cell 3) that are in proximity to the UE 402 (e.g., the UE 402 is within their coverages) may also be communicating with other UEs, where their communications may be perceived by the UE 402 as interference.

For example, as shown at 404 of the diagram 400B of FIG. 4B, the second cell may be configured/scheduled to transmit two mini-slots within the same time as the DL slot of the UE 402. Thus, as shown at 406, the UE 402 may receive interference from the second cell during these two mini-slot transmissions. Similarly, as shown at 408, the third cell may be configured/scheduled to transmit a DL transmission and receive an UL transmission within the same time as the DL slot of the UE 402. Thus, as shown at 410, the UE 402 may also receive interference from the third cell based on the third cell's DL transmission and UL reception. As such, because of the dynamic nature of the communications in its neighboring cells (e.g., the second cell and the third cell), the UE 402 in the first cell may receive a total interference as shown at 412 (e.g., combination of interferences from the second cell and the third cell), where the interference may be dynamic and/or bursty (e.g., the interference may change frequently over a short period of time).

As discussed above, most interference measurement frameworks associated with 5G NR may have a relatively large time scale. For example, IMR may be used for CSI measurement, which may be performed prior to the actual scheduling of a physical downlink shared channel (PDSCH). In most scenarios, CSI measurement and reporting are to assist a scheduler (e.g., a base station or a network entity) making a correct scheduling decision for a certain UE. CSI-RS is another reference signal that may be used in DL transmission for the purpose of channel sounding and measuring the characteristics of a radio channel so that a correct modulation, code rate, and/or beam forming may be used by a transmitter and/or a receiver. For example, a UE may use CSI-RS to measure the quality of a DL channel and report this to a serving base station in an UL through CSI reports. In some examples, resource elements (REs) carrying the CSI-RS may be configured to be either zero power (ZP) CSI-RS or non-zero power (NZP) CSI-RS. NZP CSI-RS may be used for procedures like channel measurement, beam management, beam measurement, and/or connected mode mobility, etc., whereas ZP CSI-RS are empty resource elements that may be used for interference measurement. ZP CSI-RS may define a set of REs which do not contain any transmission for a UE. However, the set of REs may contain transmissions for other UE(s). The set of REs may puncture a PDSCH so that the UE does not expect to receive any DL data within them (e.g., ZP CSI-RS may be used to configure a RE puncturing pattern for the PDSCH when some REs are allocated for other purposes).

In some scenarios, a UE may not always expect ZP CSI-RS to be nested or configured in a PDSCH as ZP CSI-RS is triggered by a serving base station with the scheduling downlink control information (DCI). Since NZP CSI-RS may be transmitted from the same cell on the same resource as ZP CSI-RS, the measured interference from the ZP CSI-RS may not be the correct interference measurement from other neighboring cells. In addition, ZP CSI-RS is a single-symbol resource, which may not be adequate to measure symbol-by-symbol variation of the interference. As such, one aspect of the present disclosure is to provide flexible null tone patterns embedded inside a PDSCH that is capable of adapting to varying environment conditions and providing symbol-level interference measurement. For purposes of the present disclosure, the term "null tone" may refer to a non-transmission on a time-frequency resource (e.g., on a resource element (RE)). The term "null tone pattern" may refer to an organization and/or mapping of a plurality of null tones in a specified order to subcarriers within OFDM symbols for one or more resource blocks. In other words, a null tone pattern may correspond to a set of null tones with a predefined pattern.

Aspects presented herein may improve interference measurements for dynamic and/or bursty transmissions, such as measurements for inter-cell interference in the symbol time scale. Aspects presented herein may enable a network entity to configure one or more null tone patterns for a UE, such that the UE may measure interference corresponding to resources associated with the null tone patterns. Aspects presented herein may also enable the network and/or the UE to select or change null tone patterns based on reinforcement learning (RL), such that the accuracy and efficiency of interference measurements may further be enhanced.

In one aspect of the present disclosure, a network entity may embed a set of null tones (e.g., null tones with a predefined pattern) in a scheduled PDSCH, and a UE receiving the PDSCH may use the set of null tones to measure the interference experienced by the PDSCH. The interference measurement by the null tones may be used for symbol-level and/or sub-band-level $R_{nn}$ measurements, which may be used by a receiver's demodulation and/or decoding blocks. The null tones or the null tone patterns proposed by the present disclosure may provide flexible density of REs over both time and frequency domains, which may be adequate for a UE to measure bursty interference with higher time and/or frequency granularity. In addition, RL and machine learning (ML) algorithms may further be used in association with the null tones, such that the null tones embedded in a scheduled PDSCH may adapt to varying environment conditions. This may in turn enhance the throughput, block error rate (BLER), and the overall performance of the network.

In one example, a null tone pattern may be associated with a set of null tones that is allocated or configured with a time domain density (L) and a frequency domain density (K), which may collectively be referred to as a null tone density. As such, the term "null tone density" may refer to, for example, a number density or concentration associated with how often or in how many subframes a null tone is presented or used. The time domain density (L) may be an integer, such as one (1), two (2), four (4), etc. (e.g., L=1, 2, 4, etc.), that indicates how often a null tone is transmitted in symbols. For example, L=1 may indicate that a null tone is transmitted on every PDSCH symbol, L=2 may indicate that a null tone is transmitted on one symbol in every two PDSCH symbols, L=4 may indicate that a null tone is transmitted on one symbol in every four PDSCH symbols, and so on. Similarly, the frequency domain density (K) may be an integer, such as one (1), two (2), four (4), etc. (e.g., K=1, 2, 4, etc.), that indicates how often a null tone is transmitted in resource blocks (RBs). For example, K=1 may indicate that a null tone is transmitted on a single tone every PDSCH RB, K=2 may indicate that a null tone is transmitted on a single tone every two PDSCH RBs, K=4 may indicate that a null tone is transmitted on a single tone every four PDSCHRBs, and so on.

Figure 5:
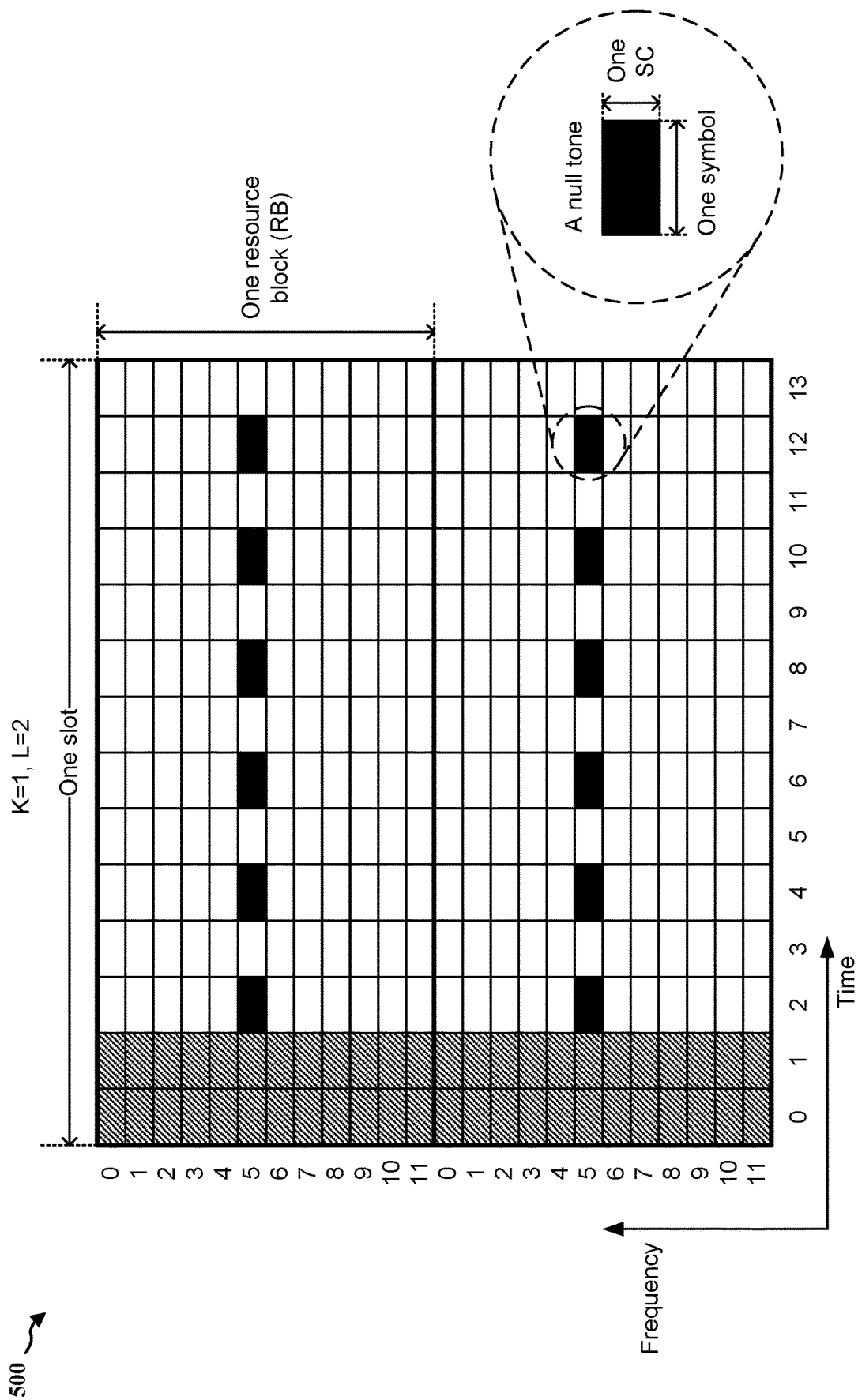
FIG. 5 is a diagram illustrating an example null tone pattern with a time domain density of two (L=2) and a frequency domain density of one (K=1) in accordance with various aspects of the present disclosure.

FIG. 5 is a diagram 500 illustrating an example null tone pattern with a time domain density of two (L=2) and a frequency domain density of one (K=1) in accordance with various aspects of the present disclosure. As shown by the diagram 500, for K=1 and L=2, a null tone may be transmitted on a single tone every RB (e.g., on one subcarrier (SC) in each RB) and on one symbol in every two symbols.

Figure 6:
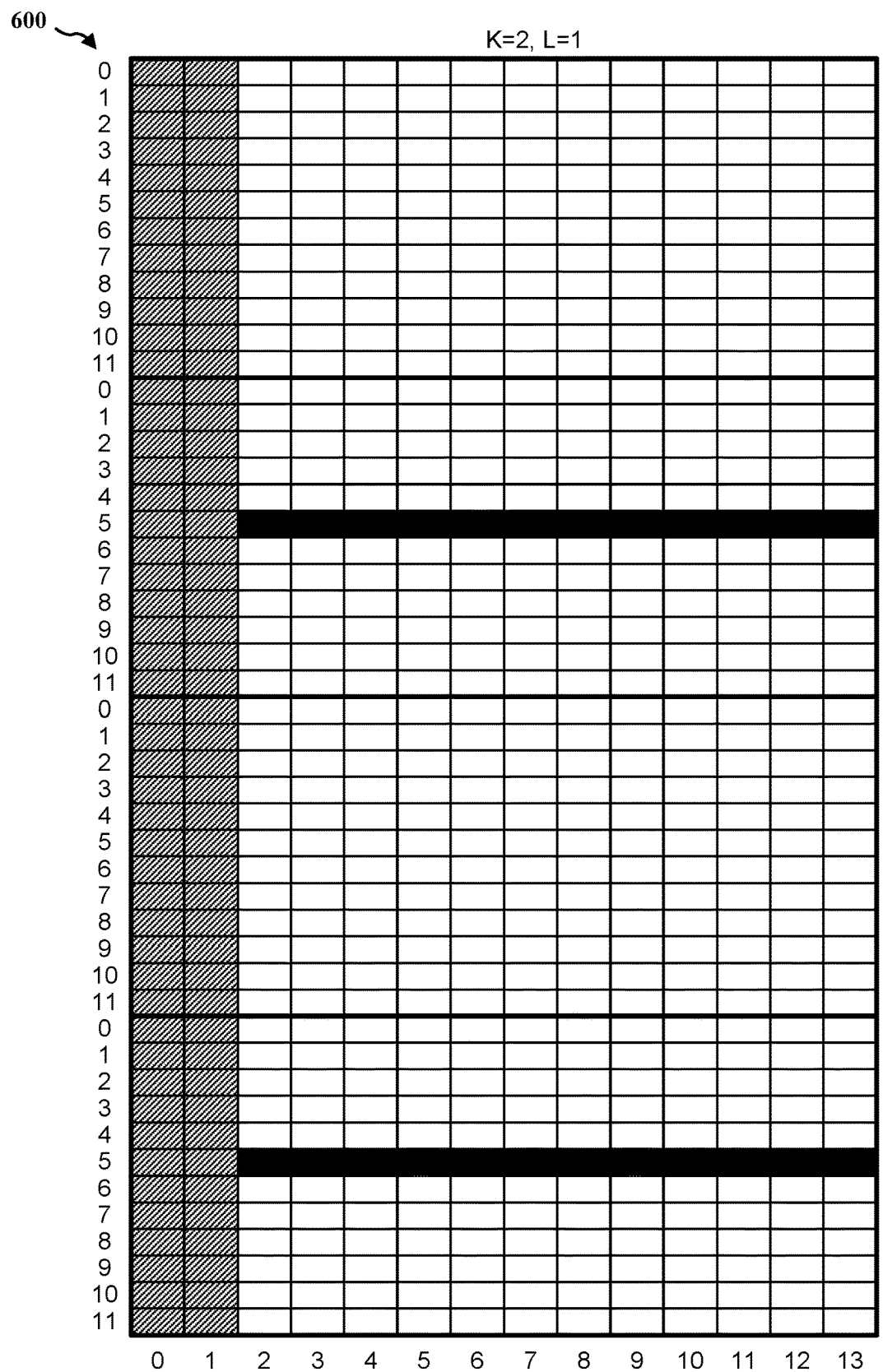
FIG. 6 is a diagram illustrating an example null tone pattern with a time domain density of one (L=1) and a frequency domain density of two (K=2) in accordance with various aspects of the present disclosure.

FIG. 6 is a diagram 600 illustrating an example null tone pattern with a time domain density of one (L=1) and a frequency domain density of two (K=2) in accordance with various aspects of the present disclosure. As shown by the diagram 600, for K=2 and L=1, a null tone may be transmitted on a single tone every two PDSCH RBs (e.g., on one subcarrier (SC) in two RBs) and on every symbol.

In one example, the interference measurement for a set of null tones may be based on measuring the interference at each null tone and averaging the measured interference (e.g., $\hat{R}_{nn} = \text{avg}\{yy^H\}$). For example, if there are four (4) null tones in the set of null tones and their measured interference are 1 dB, 4 dB, 2 dB, and 5dB, then the interference measurement for the set of null tones may be 3 dBs (e.g., (1+4+2+5)/4=3). In another example, the interference measurement for a set of null tones may be based on correlation between null tones and/or interference. For example, the interference measurement in a set of null tones may be based on a highest interference measured in the set of null tones, average of null tones with interference exceeding a threshold, an average of N null tones with highest interference, etc.

In some scenarios, different null tone patterns may provide different interference measurement qualities in a given environment or traffic. Table 2 below shows examples of different null tone patterns in accordance with various aspects of the present disclosure.

TABLE 2

Example Null Tone Patterns

| Null Tone Pattern | Time Domain Density (L) | Frequency Domain Density (K) |
|---|---|---|
| 1 | 1 | 1 |
| 2 | 1 | 2 |
| 3 | 1 | 3 |
| 4 | 1 | 4 |
| 5 | 2 | 1 |
| 6 | 2 | 2 |
| 7 | 2 | 3 |
| 8 | 2 | 4 |
| 9 | 4 | 1 |
| 10 | 4 | 2 |
| 11 | 4 | 3 |
| 12 | 4 | 4 |

In one example, a null tone pattern with a higher density (e.g., the first null tone pattern (e.g., L=1 and K=1)) may be suitable for an environment with a high number of URLLC and/or mini-slots transmissions, where a UE may be configured to perform interference measurement in every symbol and RB so that a network (e.g., a serving base station) may have a better knowledge in determining how to schedule UL/DL transmissions for a plurality of UEs. On the other hand, for an environment with a low number of URLLC and/or mini-slots transmissions or traffics, a null tone pattern with a lower density (e.g., null patterns 7 to 12, etc.) may be more suitable as a UE may not be specified to measure the interference that often, and more resources may be used for DL/UL transmissions instead of null tones.

As such, in another aspect of the present disclosure, to improve the network and/or the UE's selection/configuration regarding which null tone pattern to apply, at least one type of artificial intelligence and/or machine learning (AI/ML) algorithm/function may be used in association with the selection/configuration of the null tone patterns at the network and/or at the UE. In one example, AI may be broadly defined as configuring computers/electronics devices to perform tasks regarded as uniquely human. ML may be one category of AI techniques, which may include algorithms that are capable of automatically improving their performance without explicit programming.

In some examples, ML algorithms may include supervised learning, unsupervised learning, and/or reinforcement learning (RL). Under the supervised learning, an ML model may specify labelled input and output data during the training phase of the ML. This training data is often labelled by a data scientist in the preparation phase, before being used to train and test the ML model. Once the ML model has learned the relationship between the input and output data, it can be used to classify new and unseen datasets and predict outcomes. Under the unsupervised learning, an ML model may be trained based on raw and unlabeled training data, where the ML model is often used to identify patterns and trends in raw datasets, or to cluster similar data into a specific number of groups. Unsupervised machine learning may be more of a hands-off approach compared to the supervised learning, where the ML model may be configured to process huge arrays of data effectively without human oversight. Under the RL, an ML model may be trained based on rewarding suitable behaviors and/or punishing unsuitable behaviors. For example, positive values may be assigned to the suitable actions to encourage the ML model and negative values may be assigned to unsuitable behaviors. This may enable the ML model to seek a long-term and maximum overall reward to achieve an optimal solution. ML models are often associated with neural networks (NNs), which may also be known as artificial neural networks (ANNs) or simulated neural networks (SNNs). A neuro network may refer to a computer architecture in which a number of processors are interconnected in a manner suggestive of the connections between neurons in a human brain and which is able to learn by a process of trial and error.

For purposes of the present disclosure, an "inference" or an "ML inference" may refer to a process of running data points into an ML model (e.g., via an inference host) to calculate an output such as a single numerical score, e.g., to use a trained ML algorithm to make a prediction. An "inference host" or an "ML inference host" may refer to a network function which hosts the ML model during an inference mode. On the other hand, a "training" or an "ML training" may refer to a process of running data points to train or teach an ML model (e.g., via a training host). A "training host" or an "ML training host" may refer to a network function which hosts the ML model during a training mode.

In one aspect, the ML inferencing (and additionally the ML training) for which null tone pattern(s) to apply for a given environment or condition (which may be referred to as null tones adaptation inference) may be performed at the network side, at the UE side, or both. For example, in some scenarios, it may be beneficial to deploy the null tones adaptation inference at a base station side as the base station is often the network node/entity responsible for configuring null tone patterns and scheduling UL/DL transmissions for UEs. In this scenario, a UE may be configured to report rewards and states from previous null tone patterns to a serving base station for an RL, and the serving base station may run the inference algorithm and configure the UE with one or more selected null tone patterns.

For purposes of the present disclosure, an RL algorithm, in the context of ML and AI, may include at least one type of dynamic programming that trains algorithms using a system of reward and punishment. The RL algorithm, which may also be referred to as an agent, may learn by interacting with its environment. The agent may receive rewards by performing correctly and receive penalties for performing incorrectly, and the goal of the agent is to maximize the numerical reward. The agent may learn without intervention from a human by maximizing its reward and minimizing its penalty. A state may refer to a current situation in which the agent is experiencing.

For example, an agent may configure different null tone patterns for a UE under a given environment (e.g., at a given area at a given time) or a given condition (e.g., when the traffic is above a threshold or when a UE is at an intersection of multiple cells, etc.). In response, the UE may use the configured null tone patterns to perform interference measurements for the given environment or condition. For each null tone pattern used by the UE for measuring the interference, the UE may provide a score for that null tone pattern, where a high score (e.g., a reward) may correspond to a null tone pattern being more suitable for that given environment or condition, and a low score (e.g., a punishment) may correspond to a null tone pattern being less suitable for that given environment or condition, etc. In one example, whether a null tone pattern is suitable for a given environment or condition may be based on whether the UE is capable of accurately measuring or determining the interference via the set of null tones that is associated with the null tone pattern. In this example, the accuracy of the interference measurement may be the state, where a reward (e.g., a higher score) may be provided to the agent for configuring a null tone pattern (which may be referred to as an action) that improves the state, and a punishment (e.g., a lower score) may be provided to the agent for configuring a specific null tone pattern that does not improve or deteriorates the state. As such, one goal of the agent is to find a null tone pattern with a highest score for each given environment or condition.

In some scenarios, it may be beneficial to deploy the null tones adaptation inference at the UE side as the UE is often the network node/entity experiencing the interference, where the interference states and null tone pattern rewards/punishments may be better evaluated at the UE. In this scenario, a UE may run the inference algorithm and report the outcome of the inference (e.g., one or more recommended null tone patterns) and/or the rewards of the configured null tone patterns to a serving base station. In response, the base station may utilize the recommended null tone patterns and/or their associated rewards in assigning future null tone pattern(s) for the UE. For example, a base station may configure a UE with a set of null tone patterns. After measuring the interference based on the set of null tone patterns, the UE may run the inference algorithm and determine that a first null tone pattern and a second null tone pattern in the set of null tone patterns are more suitable for current environment/condition. Then, the UE may report the rewards associated with the first null tone pattern and the second null tone pattern to the base station. Based on the rewards, the base station may determine which null tone pattern in the set of null tone patterns to configure for the UE in the future (e.g., for subsequent PDSCH transmissions). In some examples, the UE may also indicate a preferred/recommended null tone pattern to the base station based on the rewards/punishments from the inference algorithm, and the base station may configure the indicated null tone pattern for the UE. For example, the UE may determine that a first null tone pattern has a highest score based on the inference algorithm, and the UE may indicate/recommend to the base station to configure the first null tone pattern for the UE for at least one subsequent PDSCH transmission.

Regardless whether the RL algorithm (e.g., null tones adaptation inference and/or training) is deployed at the base station/network side or at the UE side, one goal of the RL algorithm is to select at least one null tone pattern(s) that maximizes/optimizes the expected reward. In another aspect of the present disclosure, different RL algorithms/approaches may be used for this null tone pattern optimization process, which may include at least a multi-armed bandit (MAB) epsilon-greedy (ϵ-greedy) strategy, a MAB upper confidence bound (UCB) strategy, and/or a Q-learning/deep Q-learning strategy, etc.

In one example, for all RL algorithms/approaches, at each time (t), an optimizer function of the RL algorithm may select one of the null tone patterns and compute the reward of a selected null tone pattern. For example, if $\mathcal{R}_i(t)$ denotes the reward function of a null tone pattern i at time t, an example reward function may be represented by:

$$\mathcal{R}_i(t) = \frac{C^s(t) + \beta C^f(t)}{N + \alpha},$$

where $C^s(t)$ is the average interference correlation between successive null tones in time domain; $C^f(t)$ is the average interference correlation between the successive null tones in frequency domain; N is the number of null tones/RBs; α is a constant that focuses the reward function between the interference correlation and the number of null tones penalty; and β is a constant that focuses the reward function between the time-domain and the frequency-domain interference correlation.

For the MAB ϵ-greedy strategy and the MAB UCB strategy, a matrix $\mathcal{R}$ may contain average rewards for all null tone patterns, and future null tone patterns may either be selected using ϵ-greedy or UCB strategies. For example, under the ϵ-greedy strategy, with probability (1−ϵ), the RL algorithm may choose a null tone pattern having the highest average reward. Whereas, with probability (ϵ), the RL algorithm may select a null tone pattern randomly and uniformly. Then, the RL algorithm may update the matrix $\mathcal{R}$ after every selection. In other words, the ϵ-greedy algorithm may make use of an exploration-exploitation tradeoff by instructing the RL algorithm to explore (e.g., to choose a random null tone pattern with probability epsilon) and exploit (e.g., to choose the null tone pattern which so far seems to be the best) the remainder of the time. Exploration allows an RL algorithm to improve its current knowledge about each action. By improving the accuracy of the estimated action-values, the RL algorithm may make more informed decisions in the future. On the other hand, exploitation chooses the greedy action to get the most reward by exploiting the RL algorithm's current action-value estimates. In some examples, by being greedy with respect to action-value estimates, the RL algorithm may not get the most reward and may lead to sub-optimal behavior. In other words, when the RL algorithm explores, it may obtain more accurate estimates of action-values, whereas when the RL algorithm exploits, it may get more reward.

In this way, as time goes on, and the RL algorithm is choosing different null tone patterns, the RL algorithm may get a sense of which choices are returning it with the highest reward. However, from time to time the RL algorithm may also choose a random null tone pattern just to make sure that it is not missing anything. Using this learning algorithm/approach, the RL algorithm may be able to provide the null tone pattern optimization.

Under the UCB strategy, the RL algorithm may be configured to avoid inefficient exploration, and the RL algorithm may favors actions that have not had a confident value estimation yet. In one example, an action at any specific time may select a null tone pattern i as follows:

$$\text{Action} = \arg\max_i \left[ \mathcal{R}_i + c\sqrt{\frac{\ln t}{A_i}} \right],$$

where $\mathcal{R}_i$ is the reward (or a current estimate or an estimated value of the action); t is the number of trials so far; $A_i$ is the number of times configuration (e.g., null tone pattern i) is selected; and c is a confidence value that controls the level of exploration. For a dynamic environment, the RL algorithm may make decisions for future null tone patterns based on previous rewards in a specific window in time (e.g., during last X seconds, minutes, hours, etc.).

For the Q-learning strategy/approach, a key idea/goal is to design an algorithm that adapts well to the interference variations over time. For example, this may be achieved by using an RL algorithm that utilizes null tone pattern configurations in its states, where the states may include: a current null tones pattern index, interference correlation across symbols, interference correlation across sub-bands, normalized throughput per RB, location of the UE with regard to the cell center, and/or environment-related states (e.g., a number of active UEs and/or beams in neighboring cells, etc.). In other words, Q-learning may be a model-free RL algorithm that learns the value of an action in a particular state. Q-learning may not specify a model of the environment (hence "model-free"), and it may handle problems with stochastic transitions and rewards without utilizing adaptations. Similarly, the rewards $\mathcal{R}_i(t)$ under the Q-learning may be obtained based on:

$$\mathcal{R}_i(t) = \frac{C_s(t) + \beta c_f(t)}{N + \alpha},$$

where interference correlation between successive null tones in time and frequency domains may be penalized by the number of null tones/RBs. In addition, under the Q-learning, the RL algorithm may choose one of the available null tone patterns.

Figure 7:
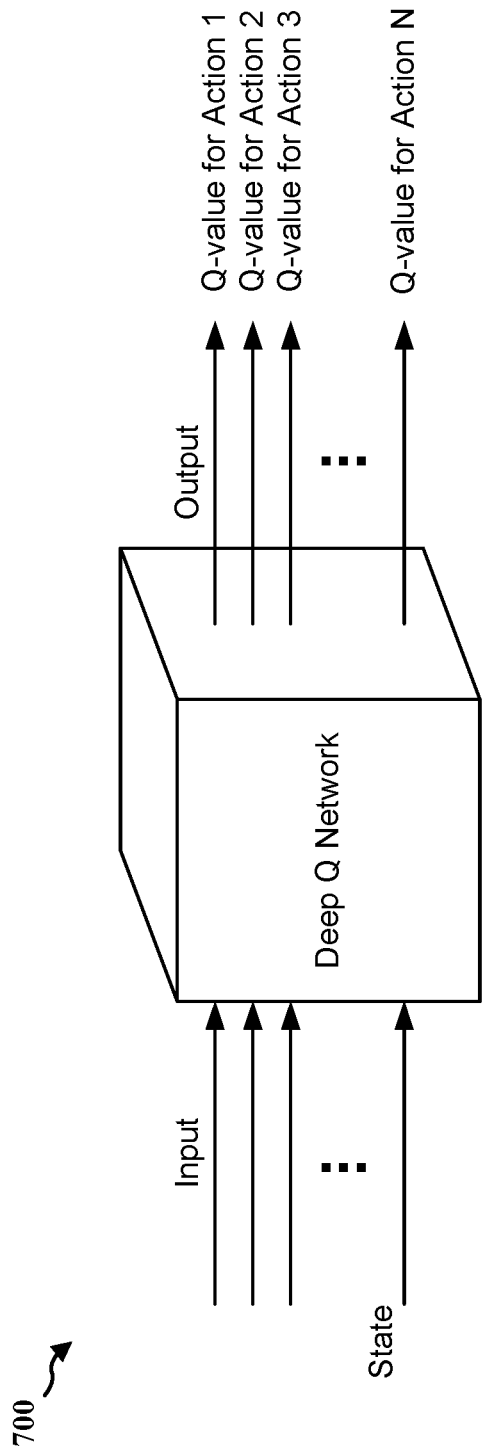
FIG. 7 is a diagram illustrating an example deep Q network in accordance with various aspects of the present disclosure.

For the deep Q-learning strategy/approach, the Q-learning algorithm discussed above may further be used in association with a neural network. In one example, deep Q-learning may refer to a method for approximating a Q function (e.g., Q(s, a)) with deep neural networks, which may be referred to as deep Q network (DQN). For example, the Q-function ($Q_\pi$(s, a)) may define the value of taking an action a, in state s, under a policy π. This value may be defined as the expected return, starting from state s, taking action a, and thereafter policy π. Under the Q-learning, the Q-function $Q_\pi$(s, a) may be calculated in a table for every state-action pair, then an action may be picked for each state using a*=argmax$_a$Q(s, a). On the other hand, under the deep Q-learning, for large state space, it can be infeasible to get Q-value for every action state-pair. As shown by a diagram 700 of FIG. 7, a neural network (e.g., a DQN) may be use to estimate $Q_\pi$(s, a; θ), where θ represents the parameters of the neural network.

In another aspect of the present disclosure, a base station or a network entity may configure one or more null tone patterns or an RL algorithm associated with the null tone patterns at a UE which enables the UE to assess the null tones pattern configuration quality. In some scenarios, it may be suitable for a base station to be responsible for configuring null tone patterns and/or the RL algorithm at a UE as the base station may have a better knowledge regarding the environmental conditions surrounding the UE. For example, the base station may be communicating with other UEs that are within the proximity of the UE and collecting data related to environmental conditions (e.g., the traffics, the number of UEs, the interference, the channel quality, etc.) from these UEs. Then, the base station may be able to configure the RL parameters for the UE more accurately based on the knowledge of the environmental conditions. For example, the base station may configure the RL parameters according to the knowledge of the UE's location (e.g., cell-edge UEs may typically experience higher interference compared to cell-center UEs). In addition, the base station may utilize its knowledge of interference patterns on selecting and/or configuring the RL parameters. In some examples, an interference pattern may depend on a plurality of external factors, such as neighboring cells' scheduling granularity, number of active UEs/TCI states, number of active beams, and/or loading, etc., where this information may be available at the base station. As such, a base station may be more suitable for configuring the RL parameters for a UE. In response, the UE may utilize the configured null tones or null tone pattern(s) for interference measurement, and assess the null tones pattern quality and send the null tone rewards to the base station.

Figure 8:
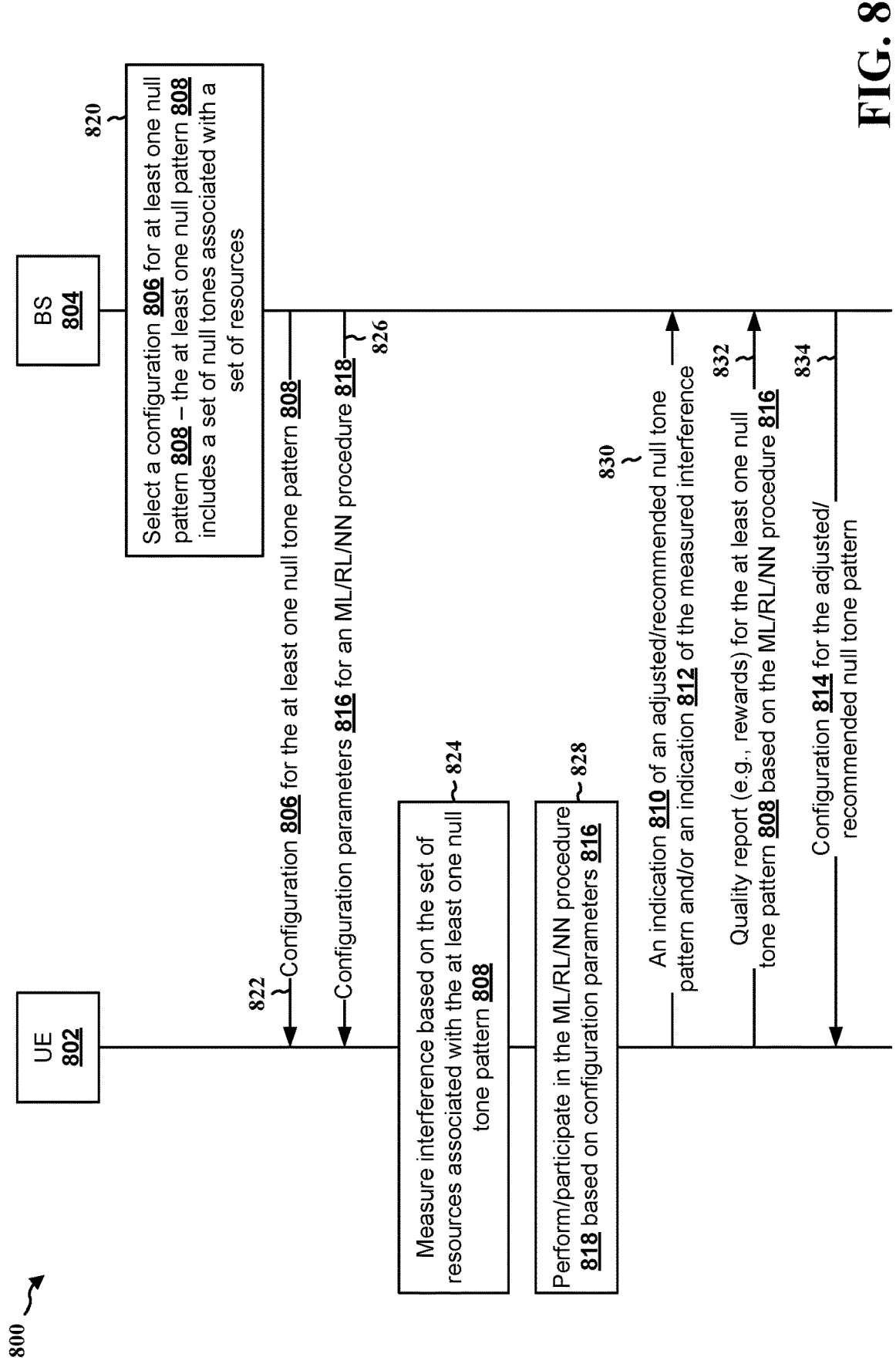
FIG. 8 is a communication flow illustrating an example of a network node configuring at least one null tone pattern and/or configuring a reinforcement learning (RL) algorithm at a UE that assesses the null tone pattern configuration quality in accordance with aspects of the present disclosure.

FIG. 8 is a communication flow 800 illustrating an example of a network node (e.g., a base station) configuring at least one null tone pattern and/or configuring an RL algorithm at a UE that assesses the null tone pattern configuration quality in accordance with aspects of the present disclosure. The numberings associated with the communication flow 800 do not specify a particular temporal order and are merely used as references for the communication flow 800. Aspects presented herein may enable a base station to configure a reward function for optimizing the null tone patterns at a UE, where the reward function may be based on the interference correlation (i.e., interference correlation between successive null tones in time and frequency domains penalized by the number of null tones).

At 820, a base station 804 (or a network entity/node) may select a configuration 806 for at least one null tone pattern 808, where the at least one null tone pattern 808 may include a set of null tones that is associated with a set of resources, such as described in connection with FIGS. 5 and 6 and Table 2. Each null tone in the set of null tones may correspond to at least one resource in the set of resources.

At 822, the base station 804 may transmit the configuration 806 for the at least one null tone pattern 808 to a UE 802, such as described in connection with FIGS. 5 and 6. In one example, the base station 804 may configure multiple null tone patterns for the UE via radio resource control (RRC) or medium access control (MAC) control element (MAC-CE). Then, the base station 804 may dynamically indicate the at least one null tone pattern 808 in the multiple null tone patterns to the UE 802 using scheduling downlink control information (DCI).

At 824, the UE 802 may measure the interference based on the set of resources associated with the at least one null tone pattern 808. For example, the base station 804 may transmit at least one DL transmission (e.g., a PDSCH) that includes the set of null tones (or the at least one null tone pattern 808), and the UE 802 may receive the DL transmission and measure the interference (e.g., for the channel associated with the DL transmission) based on the set of null tones (or the at least one null tone pattern 808). In one example, the UE 802 may measure the interference based on calculating an average of interferences measured at each of the set of resources (e.g., at each null tone).

In one example, if the configuration/selection of null tone pattern is associated with an ML, RL, or NN procedure 818, at 826, the base station 804 may configure the UE 802 with a set of configuration parameters 816 for the ML/RL/NN procedure 818. As described above, the training and/or the inferencing associated with the ML/RL/NN procedure 818 may be performed at the UE 802, at the base station 804, or at both. Then, at 828, the UE 802 may perform or participate in the ML/RL/NN procedure 818 based on configuration parameters 816.

For example, the base station 804 may configure a reward function associated with the ML/RL/NN procedure 818 for optimizing the null tone patterns at the UE 802, where the UE 802 may be configured to report a score (e.g., a reward or a punishment) for each null tone pattern it uses for the interference measurement based on the configured reward function. In one example, as described above, the reward function may be based on $$\mathcal{R}_i(t) = \frac{C^s(t) + \beta C^f(t)}{N + \alpha},$$

where $\mathcal{R}_i(t)$ denotes the reward function of a null tone pattern i at time t; $C^s(t)$ is the average interference correlation between successive null tones in time domain; $C^f(t)$ is the average interference correlation between the successive null tones in frequency domain; N is the number of null tones per RB; $\alpha$ is a constant that focuses the reward function between the interference correlation and the number of null tones penalty; and $\beta$ is a constant that focuses the reward function between the time-domain and the frequency-domain interference correlation. In another example, the reward function may be based on a normalized throughput, $$\text{e.g., } W_i(t) = \frac{\mathcal{R}_i(t)}{\gamma M},$$

where $W_i(t)$ represents the normalized throughput, $\mathcal{R}_i(t)$ is an achieved throughput, $\gamma$ is a constant that focuses the reward function between the achieved throughput and the number of null tones per RB penalty, and M is the number of RBs. In another example, the reward function may be based on other performance impact, such as block error rate (BLER) and/or bit error rate (BER), etc. In another example, the reward function may be based on a combination of more than one performance evaluation.

In another aspect of the present disclosure, if the UE 802 is responsible for running the inference and/or performing null tone pattern selection, the base station 804 (e.g., at 826), may also configure a null tone pattern selection algorithm at the UE 802 (e.g., via the configuration parameters 816). For example, the ML/RL/NN procedure 818 (or the reward function) may be associated with ϵ-greedy strategy, UCB strategy, and/or Q-learning/deep Q-learning strategy, the base station 804 may configure the UE 802 to switch between these strategies for optimizing the null tone pattern selection or to fallback to a default approach. In addition, the base station 804 may also configure the value(s) for a selected strategy (e.g., via the configuration parameters 816). For example, the base station 804 may configure the value of probability ϵ in the ϵ-greedy strategy and the value of c in the UCB strategy $$\left(\text{e.g., Action} = \arg\max_i \left[\mathcal{R}_i + c\sqrt{\frac{\ln t}{A_i}}\right]\right).$$

The value of ϵ and c may control the trade-off between exploration and exploitation, as described previously. In another example, the UE 802 may report its UE capability for supporting one or more ML/RL/NN procedures, models, and/or strategies that produce rewards for null tone patterns. In response, the UE 802 may receive the configuration parameters 816 for the ML/RL/NN procedure 818 based at least in part on the reported UE capability.

In another aspect of the present disclosure, at 826, the base station 804 may also configure one or more states to be used for the ML/RL/NN procedure 818 for the UE 802 (e.g., via the configuration parameters 816). For example, the one or more states may include: a current reference signals pattern, an interference correlation between slots and/or sub-bands, a normalized throughput per RB, the location of the UE 802 with respect to a cell center (e.g., the UE 802 may experience higher interference if the UE 802 is at cell-edge compared to cell-center), environment-related states (e.g., resource utilization, number of active UEs, etc.), or a combination thereof.

At 828, after the UE 802 measures the interference based on the at least one null tone pattern 808 (e.g., at 824) and/or performs/participates in the ML/RL/NN procedure 818 based on configuration parameters 816 (e.g., at 828), the UE 802 may transmit an indication 810 of an adjusted/recommended null tone pattern and/or an indication 812 of the measured interference to the base station depending on the configuration. For example, if the UE 802 is configured to perform inference for the ML/RL/NN procedure 818, the UE 802 may determine which null tone pattern in the at least one null tone pattern 808 receives a highest score or reward based on the configured reward function associated with the ML/RL/NN procedure 818. Then, at 830, the UE 802 may transmit the indication 810 to the base station 804 indicating an adjusted/recommended null tone pattern.

In another example, instead of reporting an adjusted/recommended null tone pattern, at 832, the UE 802 may assess the at least one null tone pattern 808 (using the configured reward function) and provide the rewards/punishments (e.g., scores) from the reward function to the base station 804, such as via a quality report. For example, the UE 802 may report the rewards/states for each null tones pattern in the at least one null tone pattern 808 to assist the base station 804 in future null tone pattern selection. The UE 802 may report the rewards for the configured null tones pattern to the base station 804, and the UE 802 may also report the states specified to run the adaptation algorithm at the base station 804. In some examples, the rewards for null tone pattern may be conditional on the null tone pattern, the frequency range (FR), the component carrier (CC), the bandwidth part (BWP) and/or the Tx/Rx beam associated with the communication between the UE 802 and the base station 804. In response, the base station 804 may determine an adjusted/recommended null tone pattern for the UE 802 based on the quality report (e.g., based on the rewards/punishments).

Alternatively, if the UE 802 is not configured to perform inference for the ML/RL/NN procedure 818, the UE 802 may report the measured inference using the at least one null tone pattern 808 to the base station, and the base station 804 may run the inference algorithm and determine which null tone pattern in the at least one null tone pattern 808 receives a highest score or reward. Then, the base station 804 may select an adjusted/recommended null tone pattern for the UE 802 accordingly (e.g., for subsequent transmissions).

At 834, based on the indication 810 (e.g., an adjusted/recommended null tone pattern), the indication 812 (e.g., measured interference based on the at least one null tone pattern 808), and/or the quality report (e.g., rewards) for the at least one null tone pattern 808 received from the UE 802, or based on the base station 804's determination for an adjusted/recommended null tone pattern, the base station 804 may transmit a configuration 814 to the UE 802 to configure the UE 802 with the adjusted/recommended null tone pattern. Then, the base station 804 may transmit at least one subsequent transmission (e.g., DL transmission, PDSCH) with the adjusted/recommended null tone pattern. For example, the adjusted/recommended null tone pattern may be different from the at least one null tone pattern 808, where the adjusted null tone pattern may have at least a different time domain density or a different frequency domain density than the at least one null tone pattern 808, such as described in connection with FIGS. 5 and 6.

Figure 9:
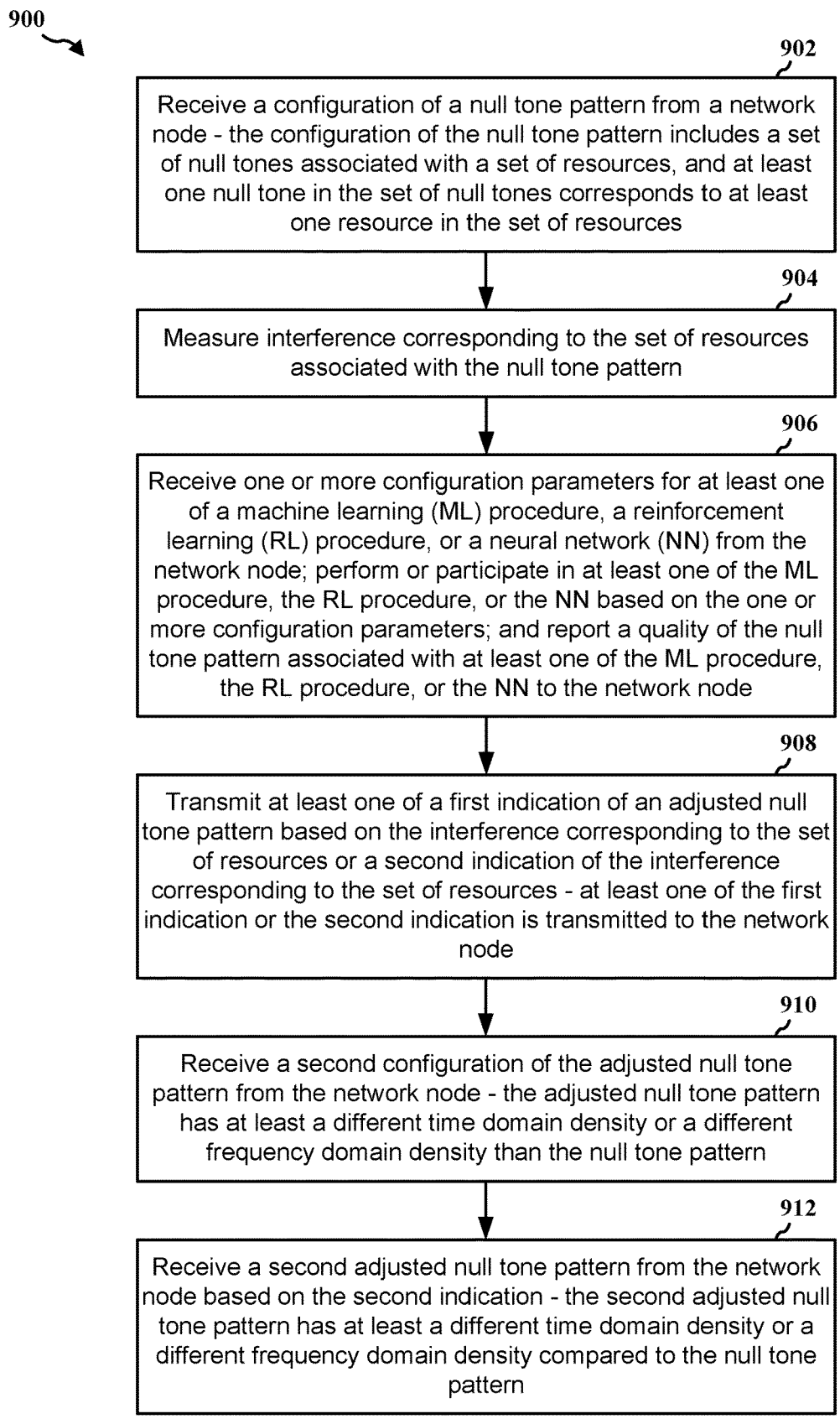
FIG. 9 is a flowchart of a method of wireless communication.

FIG. 9 is a flowchart 900 of a method of wireless communication. The method may be performed by a UE (e.g., the UE 104, 402, 802; the apparatus 1104). The method may enable the UE to be configured with at least one null tone pattern and/or an RL algorithm for the UE to assess the interference and the null tone pattern configuration quality.

At 902, the UE may receive a configuration of a null tone pattern from a network node, where the configuration of the null tone pattern includes a set of null tones associated with a set of resources, where at least one null tone in the set of null tones corresponds to at least one resource in the set of resources, such as described in connection with FIG. 8. For example, at 822, the UE 802 may receive a configuration 806 for at least one null tone pattern 808 from the base station 804, where the at least one null tone pattern 808 includes a set of null tones associated with a set of resources. The reception of the configuration may be performed by, e.g., the null tone process component 198, the cellular baseband processor 1124, and/or the transceiver(s) 1122 of the apparatus 1104 in FIG. 11.

In one example, the UE may receive multiple null tone patterns from the network node via RRC signaling or a MAC-CE, and the UE may receive a third indication to use the null tone pattern from the network node via DCI.

At 904, the UE may measure interference corresponding to the set of resources associated with the null tone pattern, such as described in connection with FIG. 8. For example, at 824, the UE 802 may measure interference based on the set of resources associated with the at least one null tone pattern 808. The measurement of the interference may be performed by, e.g., the null tone process component 198, the cellular baseband processor 1124, and/or the transceiver(s) 1122 of the apparatus 1104 in FIG. 11.

In one example, the interference is measured based on calculating an average of interferences measured at each of the set of resources.

At 906, the UE may receive one or more configuration parameters for at least one of an ML procedure, an RL procedure, or an NN from the network node, the UE may perform or participate in at least one of the ML procedure, the RL procedure, or the NN based on the one or more configuration parameters, and the UE may report a quality of the null tone pattern associated with at least one of the ML procedure, the RL procedure, or the NN to the network node, such as described in connection with FIG. 8. For example, at 826, the UE 802 may receive configuration parameters 816 for an ML/RL/NN procedure 818 from the base station 804; at 828, the UE 802 may perform/participate in the ML/RL/NN procedure 818 based on the configuration parameters 816; and at 832, the UE 802 may transmit a quality report (e.g., rewards) for the at least one null tone pattern 808 based on the ML/RL/NN procedure 818 to the base station 804. The reception of the one or more configuration parameters for at least one of an ML procedure, an RL procedure, or an NN, the performing or participating of the ML procedure, the RL procedure, or the NN, and/or reporting of the quality of the null tone pattern may be performed by, e.g., the null tone process component 198, the cellular baseband processor 1124, and/or the transceiver(s) 1122 of the apparatus 1104 in FIG. 11.

In one example, the null tone pattern is adjusted based on at least one of the ML procedure, the RL procedure, or the NN.

In another example, the quality of the null tone pattern corresponds to a reward function associated with at least one of the ML procedure, the RL procedure, or the NN, and where the reward function is based on an interference correlation, a normalized throughput, a performance impact, at least one performance evaluation, or a combination thereof.

In another example, at least one of the ML procedure, the RL procedure, or the NN is associated with at least one of: a MAB ϵ-greedy strategy, a MAB UCB strategy, a Q-learning or a deep Q-learning strategy, and the UE may receive a second configuration from the network node to switch between the MAB ϵ-greedy strategy, the MAB UCB strategy, the Q-learning, or the deep Q-learning strategy.

In another example, the UE may receive a second configuration for one or more states associated with at least one of the ML procedure, the RL procedure, or the NN from the network node, where the one or more states include: a current reference signals pattern, an interference correlation between slots or sub-bands, a normalized throughput per RB, a location of the UE with respect to a cell center, at least one environment-related state, or a combination thereof. In such an example, the UE may report one or more rewards corresponding to the one or more states associated with at least one of the ML procedure, the RL procedure, or the NN to the network node, and/or the UE may report the one or more states associated with at least one of the ML procedure, the RL procedure, or the NN to the network node, where the second configuration is received in response to the reporting.

In another example, the UE may report to the network node at least one model for at least one of the ML procedure, the RL procedure, or the NN supported by the UE, and the UE may receive one or more configuration parameters for the at least one model from the network node.

At 908, the UE may transmit at least one of a first indication of an adjusted null tone pattern based on the interference corresponding to the set of resources or a second indication of the interference corresponding to the set of resources, where at least one of the first indication or the second indication is transmitted to the network node, such as described in connection with FIG. 8. For example, at 830, the UE 802 may transmit an indication 810 of an adjusted/recommended null tone pattern and/or an indication 812 of the measured interference to the base station 804. The transmission of the first indication and/or the second indication may be performed by, e.g., the null tone process component 198, the cellular baseband processor 1124, and/or the transceiver(s) 1122 of the apparatus 1104 in FIG. 11.

At 910, the UE may receive a second configuration of the adjusted null tone pattern from the network node, where the adjusted null tone pattern has at least a different time domain density or a different frequency domain density than the null tone pattern, such as described in connection with FIG. 8. For example, at 834, the UE 802 may receive a configuration 814 from the base station 804 for an adjusted/recommended null tone pattern. The reception of the second configuration of the adjusted null tone pattern may be performed by, e.g., the null tone process component 198, the cellular baseband processor 1124, and/or the transceiver(s) 1122 of the apparatus 1104 in FIG. 11.

At 912, the UE may receive a second adjusted null tone pattern from the network node based on the second indication, where the second adjusted null tone pattern has at least a different time domain density or a different frequency domain density compared to the null tone pattern, such as described in connection with FIG. 8. at 834, the UE 802 may receive a configuration 814 from the base station 804 for an adjusted/recommended null tone pattern. The reception of the second adjusted null tone pattern may be performed by, e.g., the null tone process component 198, the cellular baseband processor 1124, and/or the transceiver(s) 1122 of the apparatus 1104 in FIG. 11.

Figure 10:
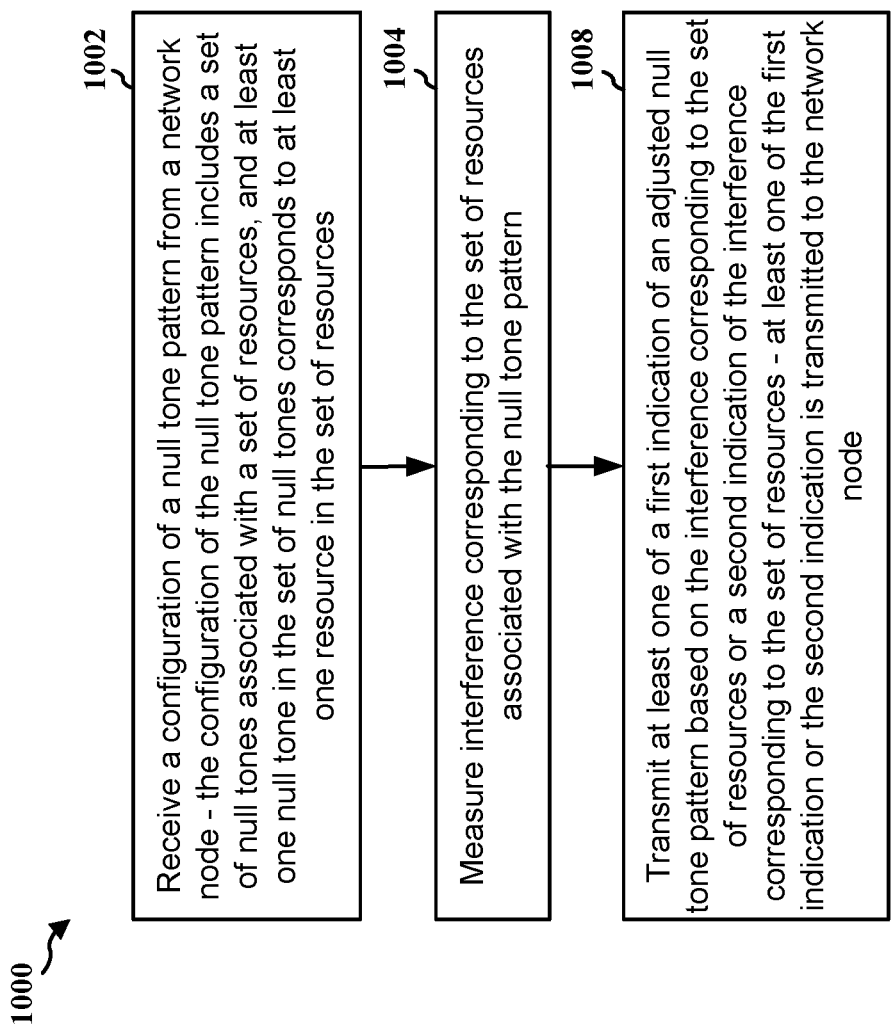
FIG. 10 is a flowchart of a method of wireless communication.

FIG. 10 is a flowchart 1000 of a method of wireless communication. The method may be performed by a UE (e.g., the UE 104, 402, 802; the apparatus 1104). The method may enable the UE to be configured with at least one null tone pattern and/or an RL algorithm for the UE to assess the interference and the null tone pattern configuration quality.

At 1002, the UE may receive a configuration of a null tone pattern from a network node, where the configuration of the null tone pattern includes a set of null tones associated with a set of resources, where at least one null tone in the set of null tones corresponds to at least one resource in the set of resources, such as described in connection with FIG. 8. For example, at 822, the UE 802 may receive a configuration 806 for at least one null tone pattern 808 from the base station 804, where the at least one null tone pattern 808 includes a set of null tones associated with a set of resources. The reception of the configuration may be performed by, e.g., the null tone process component 198, the cellular baseband processor 1124, and/or the transceiver(s) 1122 of the apparatus 1104 in FIG. 11.

In one example, the UE may receive multiple null tone patterns from the network node via RRC signaling or a MAC-CE, and the UE may receive a third indication to use the null tone pattern from the network node via DCI.

At 1004, the UE may measure interference corresponding to the set of resources associated with the null tone pattern, such as described in connection with FIG. 8. For example, at 824, the UE 802 may measure interference based on the set of resources associated with the at least one null tone pattern 808. The measurement of the interference may be performed by, e.g., the null tone process component 198, the cellular baseband processor 1124, and/or the transceiver(s) 1122 of the apparatus 1104 in FIG. 11.

In one example, the interference is measured based on calculating an average of interferences measured at each of the set of resources.

In another example, the null tone pattern is adjusted based on at least one of an ML procedure, an RL procedure, or an NN. In such an example, the UE may receive one or more configuration parameters for at least one of an ML procedure, an RL procedure, or an NN from the network node, the UE may perform or participate in at least one of the ML procedure, the RL procedure, or the NN based on the one or more configuration parameters, and the UE may report a quality of the null tone pattern associated with at least one of the ML procedure, the RL procedure, or the NN to the network node, such as described in connection with FIG. 8. For example, at 826, the UE 802 may receive configuration parameters 816 for an ML/RL/NN procedure 818 from the base station 804; at 828, the UE 802 may perform/participate in the ML/RL/NN procedure 818 based on the configuration parameters 816; and at 832, the UE 902 may transmit a quality report (e.g., rewards) for the at least one null tone pattern 808 based on the ML/RL/NN procedure 818 to the base station 804. The reception of the one or more configuration parameters for at least one of an ML procedure, an RL procedure, or an NN, the performing or participating of the ML procedure, the RL procedure, or the NN, and/or the reporting of the quality of the null tone pattern may be performed by, e.g., the null tone process component 198, the cellular baseband processor 1124, and/or the transceiver(s) 1122 of the apparatus 1104 in FIG. 11.

In another example, the quality of the null tone pattern corresponds to a reward function associated with at least one of the ML procedure, the RL procedure, or the NN, and where the reward function is based on an interference correlation, a normalized throughput, a performance impact, at least one performance evaluation, or a combination thereof.

In another example, at least one of the ML procedure, the RL procedure, or the NN is associated with at least one of: a MAB ϵ-greedy strategy, a MAB UCB strategy, a Q-learning or a deep Q-learning strategy, and the UE may receive a second configuration from the network node to switch between the MAB ϵ-greedy strategy, the MAB UCB strategy, the Q-learning, or the deep Q-learning strategy.

In another example, the UE may receive a second configuration for one or more states associated with at least one of the ML procedure, the RL procedure, or the NN from the network node, where the one or more states include: a current reference signals pattern, an interference correlation between slots or sub-bands, a normalized throughput per RB, a location of the UE with respect to a cell center, at least one environment-related state, or a combination thereof. In such an example, the UE may report one or more rewards corresponding to the one or more states associated with at least one of the ML procedure, the RL procedure, or the NN to the network node, and/or the UE may report the one or more states associated with at least one of the ML procedure, the RL procedure, or the NN to the network node, where the second configuration is received in response to the reporting.

In another example, the UE may report to the network node at least one model for at least one of the ML procedure, the RL procedure, or the NN supported by the UE, and the UE may receive one or more configuration parameters for the at least one model from the network node.

At 1008, the UE may transmit at least one of a first indication of an adjusted null tone pattern based on the interference corresponding to the set of resources or a second indication of the interference corresponding to the set of resources, where at least one of the first indication or the second indication is transmitted to the network node, such as described in connection with FIG. 8. For example, at 830, the UE 802 may transmit an indication 810 of an adjusted/recommended null tone pattern and/or an indication 812 of the measured interference to the base station 804. The transmission of the first indication and/or the second indication may be performed by, e.g., the null tone process component 198, the cellular baseband processor 1124, and/or the transceiver(s) 1122 of the apparatus 1104 in FIG. 11.

In one example, the UE may receive a second configuration of the adjusted null tone pattern from the network node, where the adjusted null tone pattern has at least a different time domain density or a different frequency domain density than the null tone pattern, such as described in connection with FIG. 8. For example, at 834, the UE 802 may receive a configuration 814 from the base station 804 for an adjusted/recommended null tone pattern. The reception of the second configuration of the adjusted null tone pattern may be performed by, e.g., the null tone process component 198, the cellular baseband processor 1124, and/or the transceiver(s) 1122 of the apparatus 1104 in FIG. 11.

In another example, the UE may receive a second adjusted null tone pattern from the network node based on the second indication, where the second adjusted null tone pattern has at least a different time domain density or a different frequency domain density compared to the null tone pattern, such as described in connection with FIG. 8. at 834, the UE 802 may receive a configuration 814 from the base station 804 for an adjusted/recommended null tone pattern. The reception of the second adjusted null tone pattern may be performed by, e.g., the null tone process component 198, the cellular baseband processor 1124, and/or the transceiver(s) 1122 of the apparatus 1104 in FIG. 11.

Figure 11:
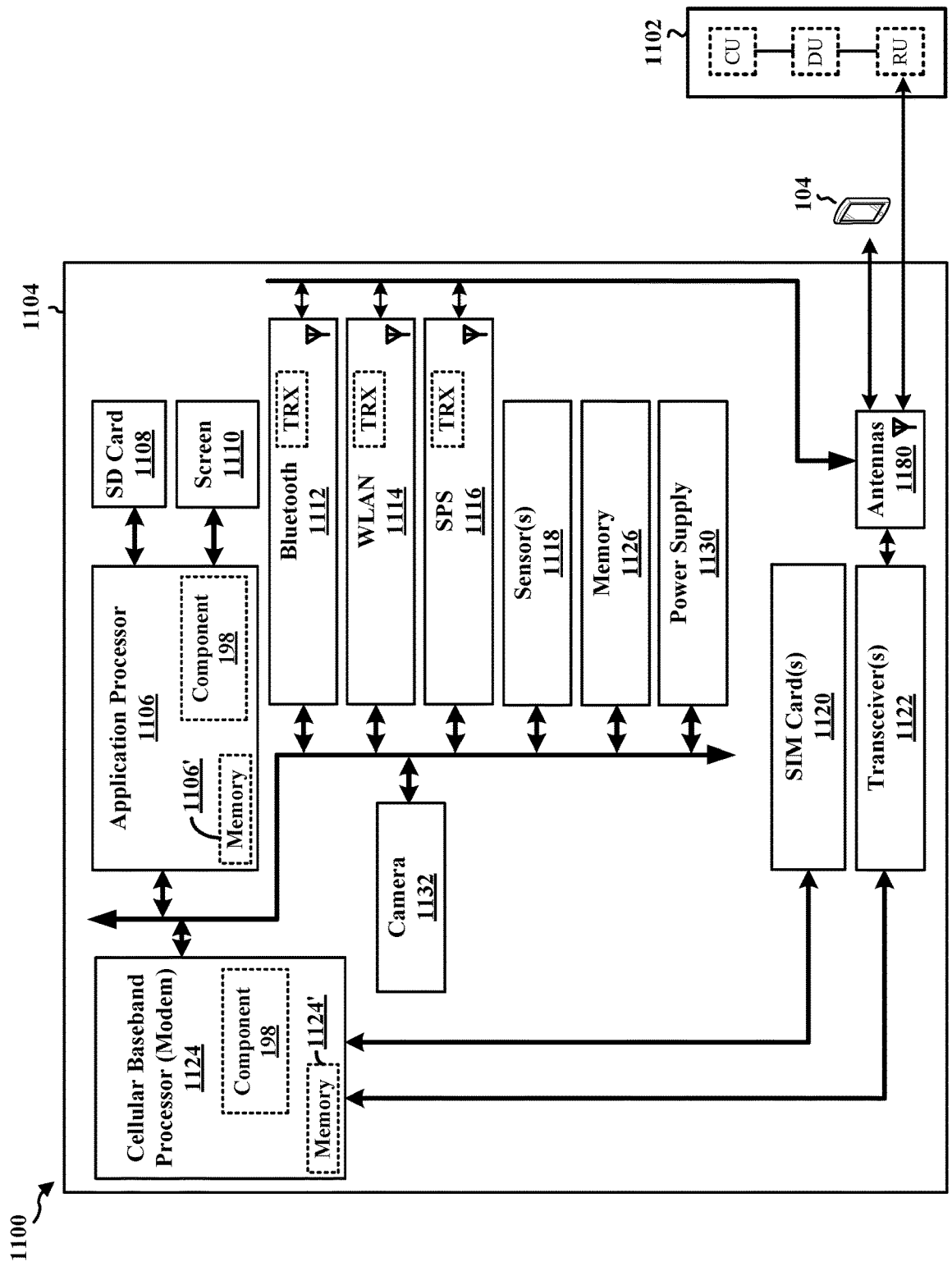
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see 350 of FIG. 3) and include the additional modules of the apparatus 1104.

As discussed supra, the null tone process component 198 is configured to receive a configuration of a null tone pattern from a network node, where the configuration of the null tone pattern includes a set of null tones associated with a set of resources, where at least one null tone in the set of null tones corresponds to at least one resource in the set of resources. The null tone process component 198 may also be configured to measure interference corresponding to the set of resources associated with the null tone pattern. The null tone process component 198 may also be configured to transmit at least one of a first indication of an adjusted null tone pattern based on the interference corresponding to the set of resources or a second indication of the interference corresponding to the set of resources, where at least one of the first indication or the second indication is transmitted to the network node. The null tone process component 198 may be within the cellular baseband processor 1124, the application processor 1106, or both the cellular baseband processor 1124 and the application processor 1106. The null tone process component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, includes means for receiving a configuration of a null tone pattern from a network node, where the configuration of the null tone pattern includes a set of null tones associated with a set of resources, where at least one null tone in the set of null tones corresponds to at least one resource in the set of resources. The apparatus 1104 may further include means for measuring interference corresponding to the set of resources associated with the null tone pattern. The apparatus 1104 may further include means for transmitting at least one of a first indication of an adjusted null tone pattern based on the interference corresponding to the set of resources or a second indication of the interference corresponding to the set of resources, where at least one of the first indication or the second indication is transmitted to the network node.

In one example, the means for receiving the configuration of the null tone pattern from the network node may include configuring the apparatus 1104 to receive multiple null tone patterns from the network node via RRC signaling or a MAC-CE, and receive a third indication to use the null tone pattern from the network node via DCI.

In another example, the interference is measured based on calculating an average of interferences measured at each of the set of resources.

In another example, the null tone pattern is adjusted based on at least one of an ML procedure, an RL procedure, or an NN. In such an example, the apparatus 1104 may further include means for receiving one or more configuration parameters for at least one of an ML procedure, an RL procedure, or an NN from the network node, means for performing or participating in at least one of the ML procedure, the RL procedure, or the NN based on the one or more configuration parameters, and means for reporting a quality of the null tone pattern associated with at least one of the ML procedure, the RL procedure, or the NN to the network node.

In another example, the quality of the null tone pattern corresponds to a reward function associated with at least one of the ML procedure, the RL procedure, or the NN, and where the reward function is based on an interference correlation, a normalized throughput, a performance impact, at least one performance evaluation, or a combination thereof.

In another example, at least one of the ML procedure, the RL procedure, or the NN is associated with at least one of: a MAB ϵ-greedy strategy, a MAB UCB strategy, a Q-learning or a deep Q-learning strategy, and the UE may receive a second configuration from the network node to switch between the MAB ϵ-greedy strategy, the MAB UCB strategy, the Q-learning, or the deep Q-learning strategy.

In another example, the apparatus 1104 may further include means for receiving a second configuration for one or more states associated with at least one of the ML procedure, the RL procedure, or the NN from the network node, where the one or more states include: a current reference signals pattern, an interference correlation between slots or sub-bands, a normalized throughput per RB, a location of the UE with respect to a cell center, at least one environment-related state, or a combination thereof. In such an example, the apparatus 1104 may further include means for reporting one or more rewards corresponding to the one or more states associated with at least one of the ML procedure, the RL procedure, or the NN to the network node, and/or means for reporting the one or more states associated with at least one of the ML procedure, the RL procedure, or the NN to the network node, where the second configuration is received in response to the reporting.

In another example, the apparatus 1104 may further include means for reporting to the network node at least one model for at least one of the ML procedure, the RL procedure, or the NN supported by the UE, and means for receiving one or more configuration parameters for the at least one model from the network node.

In another example, the apparatus 1104 may further include means for receiving a second configuration of the adjusted null tone pattern from the network node, where the adjusted null tone pattern has at least a different time domain density or a different frequency domain density than the null tone pattern.

In another example, the apparatus 1104 may further include means for receiving a second adjusted null tone pattern from the network node based on the second indication, where the second adjusted null tone pattern has at least a different time domain density or a different frequency domain density compared to the null tone pattern.

The means may be the null tone process component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
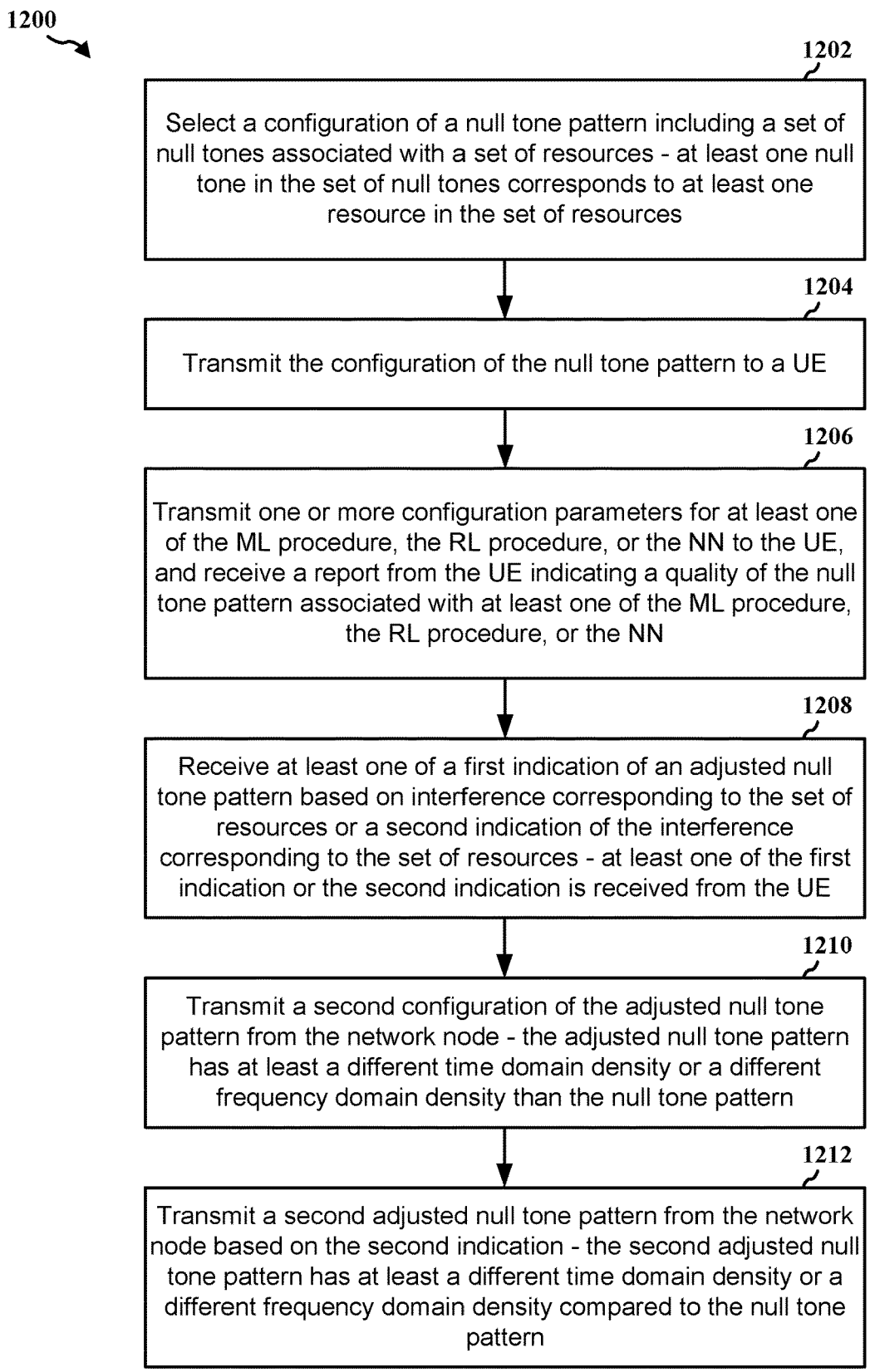
FIG. 12 is a flowchart of a method of wireless communication.

FIG. 12 is a flowchart 1200 of a method of wireless communication. The method may be performed by a base station (e.g., the base station 102, 804; the network entity 1402). The method may enable the base station to configure a UE with at least one null tone pattern and/or an RL algorithm for the UE to measure channel interference and/or assess the null tone pattern configuration quality.

At 1202, the base station may select a configuration of a null tone pattern including a set of null tones associated with a set of resources, where at least one null tone in the set of null tones corresponds to at least one resource in the set of resources, such as described in connection with FIG. 8. For example, at 820, the base station 804 may select a configuration 806 for at least one null tone pattern 808, where the at least one null tone pattern 808 includes a set of null tones associated with a set of resources. The selection of the configuration may be performed by, e.g., the null tone configuration component 199 and/or the transceiver(s) 1446 of the network entity 1402 in FIG. 14.

At 1204, the base station may transmit the configuration of the null tone pattern to a UE, such as described in connection with FIG. 8. For example, at 822, the base station 804 may transmit a configuration 806 for at least one null tone pattern 808 to the UE 802. The transmission of the configuration may be performed by, e.g., the null tone configuration component 199 and/or the transceiver(s) 1446 of the network entity 1402 in FIG. 14.

In one example, the base station may transmit multiple null tone patterns to the UE via RRC signaling or a MAC-CE, and the base station may transmit a third indication to use the null tone pattern in the multiple null tone patterns to the UE via DCI.

At 1206, the base station may transmit one or more configuration parameters for at least one of the ML procedure, the RL procedure, or the NN to the UE, and the base station may receive a report from the UE indicating a quality of the null tone pattern associated with at least one of the ML procedure, the RL procedure, or the NN, such as described in connection with FIG. 8. For example, at 826, the base station 804 may transmit configuration parameters 816 for an ML/RL/NN procedure 818 from to the UE 802, and at 832, the base station 804 may receive a quality report (e.g., rewards) for the at least one null tone pattern 808 based on the ML/RL/NN procedure 818 from the UE 802. The transmission of the one or more configuration parameters for at least one of an ML procedure, an RL procedure, or an NN, and/or the reception of report may be performed by, e.g., the null tone configuration component 199 and/or the transceiver(s) 1446 of the network entity 1402 in FIG. 14.

In one example, the null tone pattern is adjusted based on at least one of the ML procedure, the RL procedure, or the NN.

In another example, the quality of the null tone pattern corresponds to a reward function associated with at least one of the ML procedure, the RL procedure, or the NN, and where the reward function is based on an interference correlation, a normalized throughput, a performance impact, at least one performance evaluation, or a combination thereof.

In another example, at least one of the ML procedure, the RL procedure, or the NN is associated with at least one of: a MAB $\epsilon$-greedy strategy, a MAB UCB strategy, a Q-learning or a deep Q-learning strategy, and the base station may transmit a second configuration to the UE to switch between the MAB $\epsilon$-greedy strategy, the MAB UCB strategy, the Q-learning, or the deep Q-learning strategy.

In another example, the base station may transmit a second configuration for one or more states associated with at least one of the ML procedure, the RL procedure, or the NN to the UE, where the one or more states include: a current reference signals pattern, an interference correlation between slots or sub-bands, a normalized throughput per RB, a location of the UE with respect to a cell center, at least one environment-related state, or a combination thereof. In such an example, the base statin may receive a report from the UE indicating one or more rewards corresponding to the one or more states associated with at least one of the ML procedure, the RL procedure, or the NN, or the base station may receive a report from the UE indicating the one or more states associated with at least one of the ML procedure, the RL procedure, or the NN, where the second configuration is transmitted in response to the report.

At 1208, the base station may receive at least one of a first indication of an adjusted null tone pattern based on interference corresponding to the set of resources or a second indication of the interference corresponding to the set of resources, where at least one of the first indication or the second indication is received from the UE, such as described in connection with FIG. 8. For example, at 830, the base station 804 may receive an indication 810 of an adjusted/recommended null tone pattern and/or an indication 812 of the measured interference from the UE 802. The reception of the first indication and/or the second indication may be performed by, e.g., the null tone configuration component 199 and/or the transceiver(s) 1446 of the network entity 1402 in FIG. 14.

At 1210, the base station may transmit a second configuration of the adjusted null tone pattern from the network node, where the adjusted null tone pattern has at least a different time domain density or a different frequency domain density than the null tone pattern, such as described in connection with FIG. 8. For example, at 834, the base station 804 may transmit a configuration 814 to the UE 802 for an adjusted/recommended null tone pattern. The transmission of the second configuration of the adjusted null tone may be performed by, e.g., the null tone configuration component 199 and/or the transceiver(s) 1446 of the network entity 1402 in FIG. 14.

At 1212, the base station may transmit a second adjusted null tone pattern from the network node based on the second indication, where the second adjusted null tone pattern has at least a different time domain density or a different frequency domain density compared to the null tone pattern, such as described in connection with FIG. 8. For example, at 834, the base station 804 may transmit a configuration 814 to the UE 802 for an adjusted/recommended null tone pattern. The transmission of the second adjusted null tone pattern may be performed by, e.g., the null tone configuration component 199 and/or the transceiver(s) 1446 of the network entity 1402 in FIG. 14.

Figure 13:
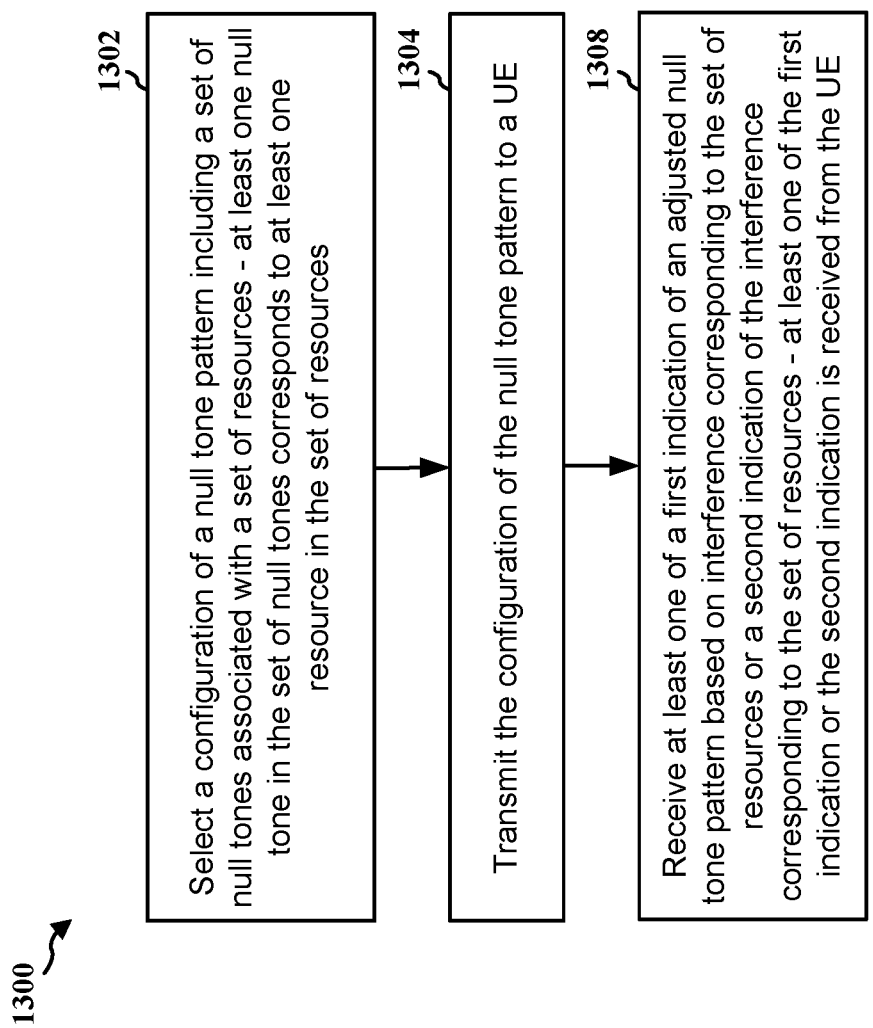
FIG. 13 is a flowchart of a method of wireless communication.

FIG. 13 is a flowchart 1300 of a method of wireless communication. The method may be performed by a base station (e.g., the base station 102, 804; the network entity 1402). The method may enable the base station to configure a UE with at least one null tone pattern and/or an RL algorithm for the UE to measure channel interference and/or assess the null tone pattern configuration quality.

At 1302, the base station may select a configuration of a null tone pattern including a set of null tones associated with a set of resources, where at least one null tone in the set of null tones corresponds to at least one resource in the set of resources, such as described in connection with FIG. 8. For example, at 820, the base station 804 may select a configuration 806 for at least one null tone pattern 808, where the at least one null tone pattern 808 includes a set of null tones associated with a set of resources. The selection of the configuration may be performed by, e.g., the null tone configuration component 199 and/or the transceiver(s) 1446 of the network entity 1402 in FIG. 14.

At 1304, the base station may transmit the configuration of the null tone pattern to a UE, such as described in connection with FIG. 8. For example, at 822, the base station 804 may transmit a configuration 806 for at least one null tone pattern 808 to the UE 802. The transmission of the configuration may be performed by, e.g., the null tone configuration component 199 and/or the transceiver(s) 1446 of the network entity 1402 in FIG. 14.

In one example, the base station may transmit multiple null tone patterns to the UE via RRC signaling or a MAC-CE, and the base station may transmit a third indication to use the null tone pattern in the multiple null tone patterns to the UE via DCI.

In one example, the null tone pattern is adjusted based on at least one of the ML procedure, the RL procedure, or the NN. In such an example, the base station may transmit one or more configuration parameters for at least one of the ML procedure, the RL procedure, or the NN to the UE, and the base station may receive a report from the UE indicating a quality of the null tone pattern associated with at least one of the ML procedure, the RL procedure, or the NN, such as described in connection with FIG. 8. For example, at 826, the base station 804 may transmit configuration parameters 816 for an ML/RL/NN procedure 818 from to the UE 802, and at 832, the base station 804 may receive a quality report (e.g., rewards) for the at least one null tone pattern 808 based on the ML/RL/NN procedure 818 from the UE 802. The transmission of the one or more configuration parameters for at least one of an ML procedure, an RL procedure, or an NN, and/or the reception of report may be performed by, e.g., the null tone configuration component 199 and/or the transceiver(s) 1446 of the network entity 1402 in FIG. 14.

In another example, the quality of the null tone pattern corresponds to a reward function associated with at least one of the ML procedure, the RL procedure, or the NN, and where the reward function is based on an interference correlation, a normalized throughput, a performance impact, at least one performance evaluation, or a combination thereof.

In another example, at least one of the ML procedure, the RL procedure, or the NN is associated with at least one of: an MAB ϵ-greedy strategy, an MAB UCB strategy, a Q-learning or a deep Q-learning strategy, and the base station may transmit a second configuration to the UE to switch between the MAB ϵ-greedy strategy, the MAB UCB strategy, the Q-learning, or the deep Q-learning strategy.

In another example, the base station may transmit a second configuration for one or more states associated with at least one of the ML procedure, the RL procedure, or the NN to the UE, where the one or more states include: a current reference signals pattern, an interference correlation between slots or sub-bands, a normalized throughput per RB, a location of the UE with respect to a cell center, at least one environment-related state, or a combination thereof. In such an example, the base statin may receive a report from the UE indicating one or more rewards corresponding to the one or more states associated with at least one of the ML procedure, the RL procedure, or the NN, or the base station may receive a report from the UE indicating the one or more states associated with at least one of the ML procedure, the RL procedure, or the NN, where the second configuration is transmitted in response to the report.

At 1308, the base station may receive at least one of a first indication of an adjusted null tone pattern based on interference corresponding to the set of resources or a second indication of the interference corresponding to the set of resources, where at least one of the first indication or the second indication is received from the UE, such as described in connection with FIG. 8. For example, at 830, the base station 804 may receive an indication 810 of an adjusted/recommended null tone pattern and/or an indication 812 of the measured interference from the UE 802. The reception of the first indication and/or the second indication may be performed by, e.g., the null tone configuration component 199 and/or the transceiver(s) 1446 of the network entity 1402 in FIG. 14.

In one example, the base station may transmit a second configuration of the adjusted null tone pattern from the network node, where the adjusted null tone pattern has at least a different time domain density or a different frequency domain density than the null tone pattern, such as described in connection with FIG. 8. For example, at 834, the base station 804 may transmit a configuration 814 to the UE 802 for an adjusted/recommended null tone pattern. The transmission of the second configuration of the adjusted null tone may be performed by, e.g., the null tone configuration component 199 and/or the transceiver(s) 1446 of the network entity 1402 in FIG. 14.

In another example, the base station may transmit a second adjusted null tone pattern from the network node based on the second indication, where the second adjusted null tone pattern has at least a different time domain density or a different frequency domain density compared to the null tone pattern, such as described in connection with FIG. 8. For example, at 834, the base station 804 may transmit a configuration 814 to the UE 802 for an adjusted/recommended null tone pattern. The transmission of the second adjusted null tone pattern may be performed by, e.g., the null tone configuration component 199 and/or the transceiver(s) 1446 of the network entity 1402 in FIG. 14.

Figure 14:
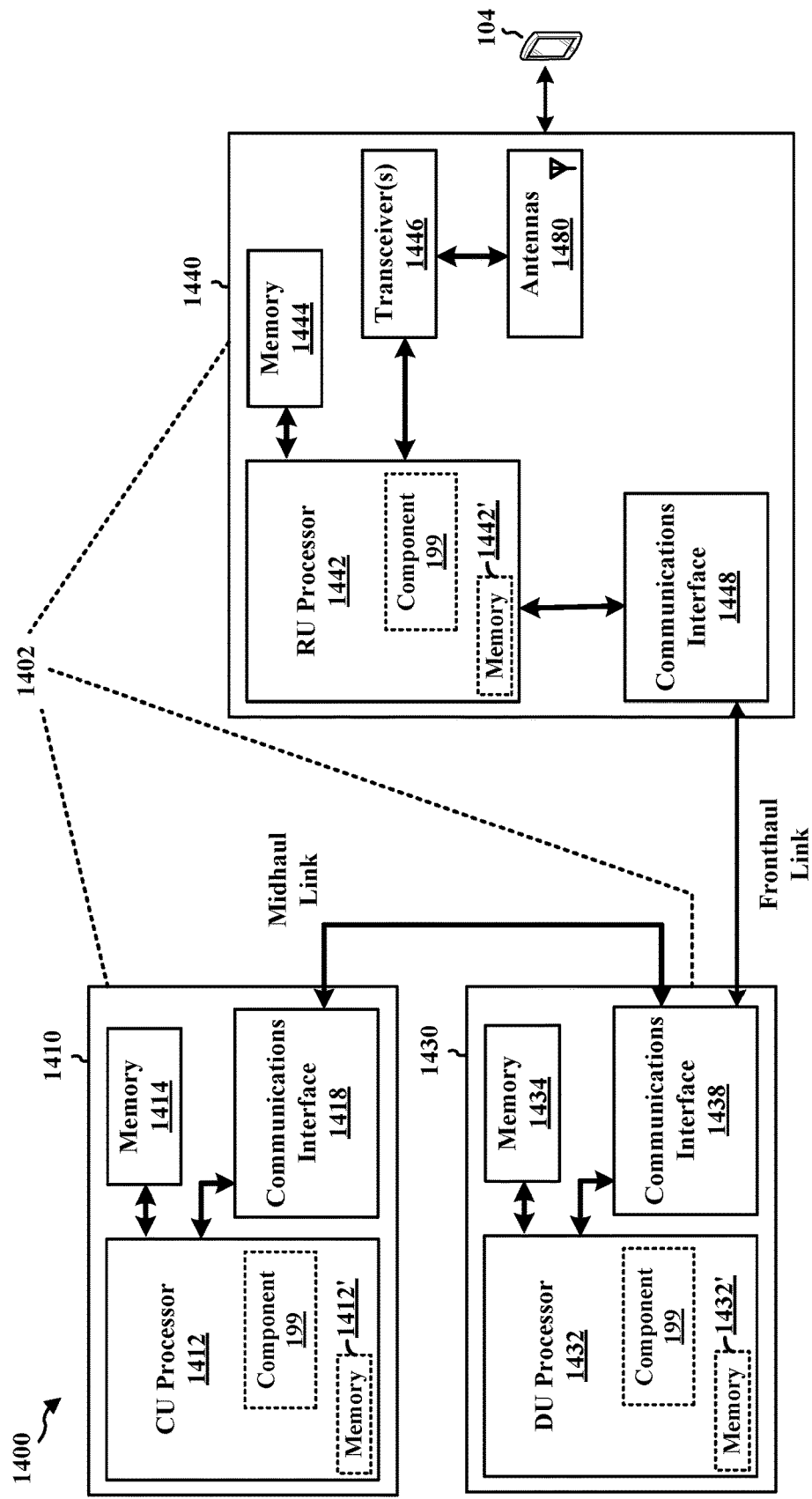
FIG. 14 is a diagram illustrating an example of a hardware implementation for an example apparatus and/or network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the null tone configuration component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include a DU processor 1432. The DU processor 1432 may include on-chip memory 1432'. In some aspects, the DU 1430 may further include additional memory modules 1434 and a communications interface 1438. The DU 1430 communicates with the RU 1440 through a fronthaul link. The RU 1440 may include an RU processor 1442. The RU processor 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the null tone configuration component 199 is configured to select a configuration of a null tone pattern including a set of null tones associated with a set of resources, where at least one null tone in the set of null tones corresponds to at least one resource in the set of resources. The null tone configuration component 199 may also be configured to transmit the configuration of the null tone pattern to a UE. The null tone configuration component 199 may also be configured to receive at least one of a first indication of an adjusted null tone pattern based on interference corresponding to the set of resources or a second indication of the interference corresponding to the set of resources, where at least one of the first indication or the second indication is received from the UE. The null tone configuration component 199 may be within one or more processors of one or more of the CU 1410, DU 1430, and the RU 1440. The null tone configuration component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 includes means for selecting a configuration of a null tone pattern including a set of null tones associated with a set of resources, where at least one null tone in the set of null tones corresponds to at least one resource in the set of resources. The network entity 1402 may further include means for transmitting the configuration of the null tone pattern to a UE. The network entity 1402 may further include means for receiving at least one of a first indication of an adjusted null tone pattern based on interference corresponding to the set of resources or a second indication of the interference corresponding to the set of resources, where at least one of the first indication or the second indication is received from the UE.

In one example, the network entity 1402 may further include means for transmitting multiple null tone patterns to the UE via RRC signaling or a MAC-CE, and means for transmitting a third indication to use the null tone pattern in the multiple null tone patterns to the UE via DCI.

In one example, the null tone pattern is adjusted based on at least one of the ML procedure, the RL procedure, or the NN. In such an example, the network entity 1402 may further include means for transmitting one or more configuration parameters for at least one of the ML procedure, the RL procedure, or the NN to the UE, and means for receiving a report from the UE indicating a quality of the null tone pattern associated with at least one of the ML procedure, the RL procedure, or the NN.

In another example, the quality of the null tone pattern corresponds to a reward function associated with at least one of the ML procedure, the RL procedure, or the NN, and where the reward function is based on an interference correlation, a normalized throughput, a performance impact, at least one performance evaluation, or a combination thereof.

In another example, at least one of the ML procedure, the RL procedure, or the NN is associated with at least one of: an MAB $\epsilon$-greedy strategy, an MAB UCB strategy, a Q-learning or a deep Q-learning strategy, and the network entity 1402 may further include means for transmitting a second configuration to the UE to switch between the MAB $\epsilon$-greedy strategy, the MAB UCB strategy, the Q-learning, or the deep Q-learning strategy.

In another example, the network entity 1402 may further include means for transmitting a second configuration for one or more states associated with at least one of the ML procedure, the RL procedure, or the NN to the UE, where the one or more states include: a current reference signals pattern, an interference correlation between slots or subbands, a normalized throughput per RB, a location of the UE with respect to a cell center, at least one environment-related state, or a combination thereof. In such an example, the network entity 1402 may further include means for receiving a report from the UE indicating one or more rewards corresponding to the one or more states associated with at least one of the ML procedure, the RL procedure, or the NN, or means for receiving a report from the UE indicating the one or more states associated with at least one of the ML procedure, the RL procedure, or the NN, where the second configuration is transmitted in response to the report.

In another example, the network entity 1402 may further include means for transmitting a second configuration of the adjusted null tone pattern from the network node, where the adjusted null tone pattern has at least a different time domain density or a different frequency domain density than the null tone pattern.

In another example, the network entity 1402 may further include means for transmitting a second adjusted null tone pattern from the network node based on the second indication, where the second adjusted null tone pattern has at least a different time domain density or a different frequency domain density compared to the null tone pattern.

The means may be the null tone configuration component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: receiving a configuration of a null tone pattern from a network node, where the configuration of the null tone pattern includes a set of null tones associated with a set of resources, where at least one null tone in the set of null tones corresponds to at least one resource in the set of resources; measuring interference corresponding to the set of resources associated with the null tone pattern; and transmitting at least one of a first indication of an adjusted null tone pattern based on the interference corresponding to the set of resources or a second indication of the interference corresponding to the set of resources, where at least one of the first indication or the second indication is transmitted to the network node.

Aspect 2 is the method of aspect 1, where the interference is measured based on calculating an average of interferences measured at each of the set of resources.

Aspect 3 is the method of any of aspects 1 or 2, where the first indication of the adjusted null tone pattern is transmitted based on the interference corresponding to the set of resources, further including: receiving a second configuration of the adjusted null tone pattern from the network node, where the adjusted null tone pattern has at least a different time domain density or a different frequency domain density than the null tone pattern.

Aspect 4 is the method of any of aspects 1 to 3, where the second indication of the interference corresponding to the set of resources is transmitted to the network node, further including: receiving a second adjusted null tone pattern from the network node based on the second indication, where the second adjusted null tone pattern has at least a different time domain density or a different frequency domain density compared to the null tone pattern.

Aspect 5 is the method of any of aspects 1 to 4, where the null tone pattern is adjusted based on at least one of an ML procedure, an RL procedure, or a NN.

Aspect 6 is the method of aspect 5, further including: receiving one or more configuration parameters for at least one of the ML procedure, the RL procedure, or the NN from the network node; performing or participating in at least one of the ML procedure, the RL procedure, or the NN based on the one or more configuration parameters; and reporting a quality of the null tone pattern associated with at least one of the ML procedure, the RL procedure, or the NN to the network node.

Aspect 7 is the method of aspect 6, where the quality of the null tone pattern corresponds to a reward function associated with at least one of the ML procedure, the RL procedure, or the NN, and where the reward function is based on an interference correlation, a normalized throughput, a performance impact, at least one performance evaluation, or a combination thereof.

Aspect 8 is the method of aspect 5, where at least one of the ML procedure, the RL procedure, or the NN is associated with at least one of: an MAB $\epsilon$-greedy strategy, an MAB UCB strategy, a Q-learning or a deep Q-learning strategy, further including: receiving a second configuration from the network node to switch between the MAB $\epsilon$-greedy strategy, the MAB UCB strategy, the Q-learning, or the deep Q-learning strategy.

Aspect 9 is the method of aspect 5, further including: receiving a second configuration for one or more states associated with at least one of the ML procedure, the RL procedure, or the NN from the network node, where the one or more states include: a current reference signals pattern, an interference correlation between slots or sub-bands, a normalized throughput per RB, a location of the UE with respect to a cell center, at least one environment-related state, or a combination thereof Aspect 10 is the method of aspect 9, further including: reporting one or more rewards corresponding to the one or more states associated with at least one of the ML procedure, the RL procedure, or the NN to the network node.

Aspect 11 is the method of aspect 9, further including: reporting the one or more states associated with at least one of the ML procedure, the RL procedure, or the NN to the network node, where the second configuration is received in response to the reporting.

Aspect 12 is the method of aspect 5, further including: reporting to the network node at least one model for at least one of the ML procedure, the RL procedure, or the NN supported by the UE; and receiving one or more configuration parameters for the at least one model from the network node.

Aspect 13 is the method of any of aspects 1 to 12, where receiving the configuration of the null tone pattern includes: receiving multiple null tone patterns from the network node via RRC signaling or a MAC-CE; and receiving a third indication to use the null tone pattern from the network node via DCI.

Aspect 14 is an apparatus for wireless communication at a UE, including: a memory; and at least one processor coupled to the memory and, based at least in part on information stored in the memory, the at least one processor is configured to implement any of aspects 1 to 13.

Aspect 15 is the apparatus of aspect 14, further including at least one of a transceiver or an antenna coupled to the at least one processor.

Aspect 16 is an apparatus for wireless communication including means for implementing any of aspects 1 to 13.

Aspect 17 is a computer-readable medium (e.g., a non-transitory computer-readable medium) storing computer executable code, where the code when executed by a processor causes the processor to implement any of aspects 1 to 13.

Aspect 18 is a method of wireless communication at a network node (e.g., a base station), including: selecting a configuration of a null tone pattern including a set of null tones associated with a set of resources, where at least one null tone in the set of null tones corresponds to at least one resource in the set of resources; transmitting the configuration of the null tone pattern to a UE; and receiving at least one of a first indication of an adjusted null tone pattern based on interference corresponding to the set of resources or a second indication of the interference corresponding to the set of resources, where at least one of the first indication or the second indication is received from the UE.

Aspect 19 is the method of aspect 18, where the interference is based on an average of interferences at each of the set of resources.

Aspect 20 is the method of aspect 18 or 19, where the first indication of the adjusted null tone pattern is received based on the interference corresponding to the set of resources, further including: transmitting a second configuration of the adjusted null tone pattern to the UE, where the adjusted null tone pattern has at least a different time domain density or a different frequency domain density than the null tone pattern.

Aspect 21 is the method of any of aspects 18 to 20, where the second indication of the interference corresponding to the set of resources is received from the UE, further including: transmitting a second adjusted null tone pattern to the UE based on the second indication, where the second adjusted null tone pattern has at least a different time domain density or a different frequency domain density than the null tone pattern.

Aspect 22 is the method of any of aspects 18 to 21, where the null tone pattern is adjusted based on at least one of an ML procedure, an RL procedure, or a NN.

Aspect 23 is the method of aspect 22, further including: transmitting one or more configuration parameters for at least one of the ML procedure, the RL procedure, or the NN to the UE; and receiving a report from the UE indicating a quality of the null tone pattern associated with at least one of the ML procedure, the RL procedure, or the NN.

Aspect 24 is the method of aspect 23, where the quality of the null tone pattern corresponds to a reward function associated with at least one of the ML procedure, the RL procedure, or the NN, and where the reward function is based on an interference correlation, a normalized throughput, a performance impact, at least one performance evaluation, or a combination thereof.

Aspect 25 is the method of aspect 25, where at least one of the ML procedure, the RL procedure, or the NN is associated with at least one of: an MAB ϵ-greedy strategy, a MAB UCB strategy, a Q-learning or a deep Q-learning strategy, further including: transmitting a second configuration to the UE to switch between the MAB ϵ-greedy strategy, the MAB UCB strategy, the Q-learning, or the deep Q-learning strategy.

Aspect 26 is the method of aspect 22, further including: transmitting a second configuration for one or more states associated with at least one of the ML procedure, the RL procedure, or the NN to the UE, where the one or more states include: a current reference signals pattern, an interference correlation between slots or sub-bands, a normalized throughput per RB, a location of the UE with respect to a cell center, at least one environment-related state, or a combination thereof.

Aspect 27 is the method of aspect 26, further including: receiving a report from the UE indicating one or more rewards corresponding to the one or more states associated with at least one of the ML procedure, the RL procedure, or the NN.

Aspect 28 is the method of aspect 26, further including: receiving a report from the UE indicating the one or more states associated with at least one of the ML procedure, the RL procedure, or the NN, where the second configuration is transmitted in response to the report.

Aspect 29 is the method of aspect 22, further including: receiving a report from the UE indicating at least one model for at least one of the ML procedure, the RL procedure, or the NN supported by the UE; and transmitting one or more configuration parameters for the at least one model to the UE.

Aspect 30 is the method of any of aspects 18 to 29, where transmitting the configuration of the null tone pattern to the UE includes: transmitting multiple null tone patterns to the UE via RRC signaling or a MAC-CE; and transmitting a third indication to use the null tone pattern to the UE via DCI.

Aspect 31 is an apparatus for wireless communication at a base station, including: a memory; and at least one processor coupled to the memory and, based at least in part on information stored in the memory, the at least one processor is configured to implement any of aspects 18 to 30.

Aspect 32 is the apparatus of aspect 31, further including at least one of a transceiver or an antenna coupled to the at least one processor.

Aspect 33 is an apparatus for wireless communication including means for implementing any of aspects 18 to 30.

Aspect 34 is a computer-readable medium (e.g., a non-transitory computer-readable medium) storing computer executable code, where the code when executed by a processor causes the processor to implement any of aspects 18 to 30.

What is claimed is:

1. An apparatus for wireless communication at a user equipment (UE), comprising:
   at least one memory; and
   at least one processor coupled to the at least one memory and, based at least in part on information stored in the memory, the at least one processor is configured to:
      receive, from a network node, a first configuration of a null tone pattern, wherein the first configuration of the null tone pattern includes a set of null tones associated with a set of resources, wherein at least one null tone in the set of null tones corresponds to at least one resource in the set of resources;
      measure interference corresponding to the set of resources associated with the null tone pattern;
      transmit, to the network node, an indication of an adjusted null tone pattern based on the interference corresponding to the set of resources; and
      receive, from the network node based on the indication of the adjusted null tone pattern, a second configuration of the adjusted null tone pattern, wherein the adjusted null tone pattern has at least a different time domain density or a different frequency domain density than the null tone pattern.

2. The apparatus of claim 1, wherein the interference is measured based on calculating an average of interferences measured at each of the set of resources.

3. The apparatus of claim 1, wherein the at least one processor is further configured to:
   adjust the null tone pattern to obtain the adjusted null tone pattern based on at least one of a machine learning (ML) procedure, a reinforcement learning (RL) procedure, or a neural network (NN).

4. The apparatus of claim 3, wherein the at least one processor is further configured to:
   receive one or more configuration parameters for at least one of the ML procedure, the RL procedure, or the NN from the network node;
   perform or participate in at least one of the ML procedure, the RL procedure, or the NN based on the one or more configuration parameters; and
   report a quality of the null tone pattern associated with at least one of the ML procedure, the RL procedure, or the NN to the network node.

5. The apparatus of claim 4, wherein the quality of the null tone pattern corresponds to a reward function associated with at least one of the ML procedure, the RL procedure, or the NN, and wherein the reward function is based on an interference correlation, a normalized throughput, a performance impact, at least one performance evaluation, or a combination thereof.

6. The apparatus of claim 3, wherein at least one of the ML procedure, the RL procedure, or the NN is associated with at least one of: a multi-armed bandit (MAB) $\epsilon$-greedy strategy, a MAB upper confidence bound (UCB) strategy, a Q-learning, or a deep Q-learning strategy, and wherein the at least one processor is further configured to:
   receive a third configuration from the network node to switch between the MAB $\epsilon$-greedy strategy, the MAB UCB strategy, the Q-learning, or the deep Q-learning strategy.

7. The apparatus of claim 3, wherein the at least one processor is further configured to:
   receive a third configuration for one or more states associated with at least one of the ML procedure, the RL procedure, or the NN from the network node, wherein the one or more states include: a current reference signals pattern, an interference correlation between slots or sub-bands, a normalized throughput per resource block (RB), a location of the UE with respect to a cell center, at least one environment-related state, or a combination thereof.

8. The apparatus of claim 7, wherein the at least one processor is further configured to:
   report one or more rewards corresponding to the one or more states associated with at least one of the ML procedure, the RL procedure, or the NN to the network node.

9. The apparatus of claim 7, wherein the at least one processor is further configured to:
   report the one or more states associated with at least one of the ML procedure, the RL procedure, or the NN to the network node, wherein the second configuration is received in response to the reporting.

10. The apparatus of claim 3, wherein the at least one processor is further configured to:
    report to the network node at least one model for at least one of the ML procedure, the RL procedure, or the NN supported by the UE; and
    receive one or more configuration parameters for the at least one model from the network node.

11. The apparatus of claim 1, wherein to receive the first configuration of the null tone pattern, the at least one processor is configured to:
    receive multiple null tone patterns from the network node via radio resource control (RRC) signaling or a medium access control (MAC)-control element (CE) (MAC-CE); and
    receive a second indication to use the null tone pattern from the network node via downlink control information (DCI).

12. A method of wireless communication at a user equipment (UE), comprising:
    receiving, from a network node, a first configuration of a null tone pattern, wherein the first configuration of the null tone pattern includes a set of null tones associated with a set of resources, wherein at least one null tone in the set of null tones corresponds to at least one resource in the set of resources;
    measuring interference corresponding to the set of resources associated with the null tone pattern;
    transmitting, to the network node, an indication of an adjusted null tone pattern based on the interference corresponding to the set of resources; and
    receive, from the network node based on the indication of the adjusted null tone pattern, a second configuration of the adjusted null tone pattern, wherein the adjusted null tone pattern has at least a different time domain density or a different frequency domain density than the null tone pattern.

13. The method of claim 12, further comprising:
    adjusting the null tone pattern to obtain the adjusted null tone pattern based on at least one of a machine learning (ML) procedure, a reinforcement learning (RL) procedure, or a neural network (NN).

14. An apparatus for wireless communication at a network node, comprising:
a memory; and
at least one processor coupled to the memory and, based at least in part on information stored in the memory, the at least one processor is configured to:
select a first configuration of a null tone pattern including a set of null tones associated with a set of resources, wherein at least one null tone in the set of null tones corresponds to at least one resource in the set of resources;
transmit the first configuration of the null tone pattern to a user equipment (UE);
receive, from the UE, an indication of an adjusted null tone pattern based on interference corresponding to the set of resources; and
transmit, to the UE based on the indication of the adjusted null tone pattern, a second configuration of the adjusted null tone pattern, wherein the adjusted null tone pattern has at least a different time domain density or a different frequency domain density than the null tone pattern.

15. The apparatus of claim 14, wherein the interference is based on an average of interferences at each of the set of resources.

16. The apparatus of claim 14, wherein the null tone pattern is adjusted based on at least one of a machine learning (ML) procedure, a reinforcement learning (RL) procedure, or a neural network (NN).

17. The apparatus of claim 16, wherein the at least one processor is further configured to:
transmit one or more configuration parameters for at least one of the ML procedure, the RL procedure, or the NN to the UE; and
receive a report from the UE indicating a quality of the null tone pattern associated with at least one of the ML procedure, the RL procedure, or the NN.

18. The apparatus of claim 17, wherein the quality of the null tone pattern corresponds to a reward function associated with at least one of the ML procedure, the RL procedure, or the NN, and wherein the reward function is based on an interference correlation, a normalized throughput, a performance impact, at least one performance evaluation, or a combination thereof.

19. The apparatus of claim 16, wherein at least one of the ML procedure, the RL procedure, or the NN is associated with at least one of: a multi-armed bandit (MAB) $\epsilon$-greedy strategy, a MAB upper confidence bound (UCB) strategy, a Q-learning, or a deep Q-learning strategy, and wherein the at least one processor is further configured to:
transmit a third configuration to the UE to switch between the MAB $\epsilon$-greedy strategy, the MAB UCB strategy, the Q-learning, or the deep Q-learning strategy.

20. The apparatus of claim 16, wherein the at least one processor is further configured to:
transmit a third configuration for one or more states associated with at least one of the ML procedure, the RL procedure, or the NN to the UE, wherein the one or more states include:
a current reference signals pattern, an interference correlation between slots or sub-bands, a normalized throughput per resource block (RB), a location of the UE with respect to a cell center, at least one environment-related state, or a combination thereof.

21. The apparatus of claim 20, wherein the at least one processor is further configured to:
receive a report from the UE indicating one or more rewards corresponding to the one or more states associated with at least one of the ML procedure, the RL procedure, or the NN.

22. The apparatus of claim 20, wherein the at least one processor is further configured to:
receive a report from the UE indicating the one or more states associated with at least one of the ML procedure, the RL procedure, or the NN, wherein to transmit the third configuration, the at least one processor is further configured to transmit the third configuration in response to the report.

23. The apparatus of claim 16, wherein the at least one processor is further configured to:
receive a report from the UE indicating at least one model for at least one of the ML procedure, the RL procedure, or the NN supported by the UE; and
transmit one or more configuration parameters for the at least one model to the UE.

24. The apparatus of claim 14, wherein to transmit the first configuration of the null tone pattern to the UE, the at least one processor is configured to:
transmit multiple null tone patterns to the UE via radio resource control (RRC) signaling or a medium access control (MAC)-control element (CE) (MAC-CE); and
transmit a second indication to use the null tone pattern to the UE via downlink control information (DCI).

25. A method of wireless communication at a network node, comprising:
selecting a first configuration of a null tone pattern including a set of null tones associated with a set of resources, wherein at least one null tone in the set of null tones corresponds to at least one resource in the set of resources;
transmitting the first configuration of the null tone pattern to a user equipment (UE);
receiving, from the UE, an indication of an adjusted null tone pattern based on interference corresponding to the set of resources; and
transmitting, to the UE based on the indication of the adjusted null tone pattern, a second configuration of the adjusted null tone pattern, wherein the adjusted null tone pattern has at least a different time domain density or a different frequency domain density than the null tone pattern.

26. The method of claim 25, wherein the null tone pattern is adjusted based on at least one of a machine learning (ML) procedure, a reinforcement learning (RL) procedure, or a neural network (NN), the method further comprising:
transmitting one or more configuration parameters for at least one of the ML procedure, the RL procedure, or the NN to the UE; and
receiving a report from the UE indicating a quality of the null tone pattern associated with at least one of the ML procedure, the RL procedure, or the NN.

* * * * *